United States Patent
Mishra et al.

(10) Patent No.: US 8,082,335 B2
(45) Date of Patent: Dec. 20, 2011

(54) METHOD AND SYSTEM FOR TELECOMMUNICATIONS NETWORK PLANNING AND MANAGEMENT

(75) Inventors: Richard Mishra, London (GB);
Markus Buchner, Munich (DE);
Johnston Harden Graham Glendinning, Bradford-on-Avon (GB);
Manfred Geyer, Munich (DE); Adan K. Pope, Riverside, IL (US)

(73) Assignee: Amdocs Systems Limited, Bath (GB)

( * ) Notice: Subject to any disclaimer, the term of this patent is extended or adjusted under 35 U.S.C. 154(b) by 589 days.

(21) Appl. No.: 11/356,392

(22) Filed: Feb. 16, 2006

(65) Prior Publication Data
US 2007/0118643 A1 May 24, 2007

(30) Foreign Application Priority Data

Nov. 18, 2005 (GB) .................................. 0523543.7

(51) Int. Cl.
*G06F 7/00* (2006.01)
*G06F 15/173* (2006.01)
*G06F 15/177* (2006.01)
*G06F 17/00* (2006.01)
*G06N 5/00* (2006.01)

(52) U.S. Cl. .......... 709/223; 706/45; 707/600; 709/220; 709/224; 709/226

(58) Field of Classification Search .................. 709/224, 709/220, 223, 226; 706/45; 707/600
See application file for complete search history.

(56) References Cited

U.S. PATENT DOCUMENTS

| | | | | |
|---|---|---|---|---|
| 5,049,873 A * | 9/1991 | Robins et al. | ............ | 340/825.01 |
| 5,054,111 A | 10/1991 | Goodwin | ........................ | 455/34 |
| 5,067,148 A * | 11/1991 | Sardana | ........................ | 379/111 |
| 5,175,800 A * | 12/1992 | Galis et al. | ...................... | 706/45 |
| 5,185,860 A | 2/1993 | Wu | ................. | 395/200 |
| 5,186,729 A | 2/1993 | Brown et al. | ..................... | 65/33 |
| 5,193,152 A * | 3/1993 | Smith | ............................ | 709/220 |
| 5,208,877 A | 5/1993 | Murphy et al. | .................. | 385/12 |
| 5,285,494 A * | 2/1994 | Sprecher et al. | .............. | 455/423 |
| 5,295,244 A * | 3/1994 | Dev et al. | ...................... | 715/853 |

(Continued)

FOREIGN PATENT DOCUMENTS

CA 2 290 221 A1 5/2000

(Continued)

OTHER PUBLICATIONS

Invitation to Pay Additional Fees and Search Report from related PCT application No. PCT/GB2006/004298 mailed on Feb. 28, 2007.

(Continued)

*Primary Examiner* — David England
*Assistant Examiner* — Daniel Murray
(74) *Attorney, Agent, or Firm* — Zilka-Kotab, PC

(57) ABSTRACT

A method of performing network modification in a telecommunications network is disclosed. The method comprises storing a database comprising a master inventory defining network resources available in the network. A network modification is performed by a process comprising modifying the database storing the master inventory; and modifying the network in dependence on the modified database. The method can be used in the management of telecommunications systems. A network planning method is also disclosed.

42 Claims, 10 Drawing Sheets

U.S. PATENT DOCUMENTS

| | | | | |
|---|---|---|---|---|
| 5,353,339 | A * | 10/1994 | Scobee | 379/201.12 |
| 5,452,415 | A * | 9/1995 | Hotka | 715/735 |
| 5,504,921 | A * | 4/1996 | Dev et al. | 709/223 |
| 5,650,994 | A * | 7/1997 | Daley | 370/259 |
| 5,680,625 | A | 10/1997 | Sekine et al. | 395/750 |
| 5,754,831 | A | 5/1998 | Berman | 395/500 |
| 5,821,937 | A | 10/1998 | Tonelli et al. | 345/356 |
| 5,831,610 | A | 11/1998 | Tonelli et al. | 345/335 |
| 5,832,503 | A | 11/1998 | Malik et al. | |
| 5,864,541 | A | 1/1999 | Abu-Amara et al. | 370/253 |
| 5,886,907 | A | 3/1999 | Abu-Amara et al. | 364/578 |
| 5,905,715 | A | 5/1999 | Azarmi et al. | 370/244 |
| 5,943,244 | A * | 8/1999 | Crawford et al. | 703/13 |
| 5,943,480 | A | 8/1999 | Neidhardt | 395/200.56 |
| 5,951,644 | A * | 9/1999 | Creemer | 709/229 |
| 5,963,911 | A | 10/1999 | Walker et al. | 705/7 |
| 6,009,466 | A | 12/1999 | Axberg et al. | |
| 6,055,240 | A | 4/2000 | Tunnicliffe | 370/428 |
| 6,075,631 | A | 6/2000 | Bala et al. | 359/124 |
| 6,091,713 | A | 7/2000 | Lechleider et al. | 370/248 |
| 6,094,580 | A | 7/2000 | Yu et al. | 455/446 |
| 6,097,722 | A | 8/2000 | Graham et al. | 370/395 |
| 6,101,538 | A | 8/2000 | Brown | 709/223 |
| 6,108,702 | A | 8/2000 | Wood | 709/224 |
| 6,141,552 | A | 10/2000 | Sendonaris et al. | 455/436 |
| 6,151,305 | A | 11/2000 | Chen | 370/238 |
| 6,151,512 | A | 11/2000 | Chheda et al. | 455/562 |
| 6,173,175 | B1 | 1/2001 | Alazma et al. | 455/423 |
| 6,173,186 | B1 | 1/2001 | Dalley | 455/446 |
| 6,182,134 | B1 * | 1/2001 | Collins et al. | 709/224 |
| 6,185,519 | B1 | 2/2001 | Lin et al. | 703/21 |
| 6,188,914 | B1 | 2/2001 | Chheda | 455/562 |
| 6,215,771 | B1 | 4/2001 | Turner et al. | 370/235 |
| 6,223,219 | B1 | 4/2001 | Uniacke et al. | 709/223 |
| 6,226,273 | B1 | 5/2001 | Busuioc et al. | 370/236 |
| 6,229,540 | B1 | 5/2001 | Tonelli et al. | 345/356 |
| 6,247,049 | B1 | 6/2001 | Scott | 709/222 |
| 6,253,065 | B1 | 6/2001 | Palmer | 455/67.3 |
| 6,266,694 | B1 | 7/2001 | Duguay et al. | 709/223 |
| 6,295,540 | B1 | 9/2001 | Sanschagrin et al. | 707/201 |
| 6,308,174 | B1 | 10/2001 | Hayball et al. | 707/10 |
| 6,310,883 | B1 | 10/2001 | Mann et al. | 370/408 |
| 6,314,093 | B1 | 11/2001 | Mann et al. | 370/351 |
| 6,314,109 | B1 | 11/2001 | Oman | 370/467 |
| 6,321,253 | B1 | 11/2001 | McKeen et al. | 709/204 |
| 6,336,035 | B1 | 1/2002 | Somoza et al. | 455/446 |
| 6,349,306 | B1 * | 2/2002 | Malik et al. | 707/103 R |
| 6,351,213 | B1 | 2/2002 | Hirsch | 340/506 |
| 6,356,627 | B1 | 3/2002 | Hayball et al. | 379/112.01 |
| 6,363,420 | B1 | 3/2002 | Coward | 709/221 |
| 6,393,425 | B1 * | 5/2002 | Kelly | 707/100 |
| 6,393,475 | B1 | 5/2002 | Leong et al. | 709/223 |
| 6,396,810 | B1 | 5/2002 | Hebel | 370/248 |
| 6,405,248 | B1 | 6/2002 | Wood | 709/223 |
| 6,408,312 | B1 | 6/2002 | Forthman et al. | 707/203 |
| 6,411,798 | B1 | 6/2002 | Frenkel et al. | 455/67.4 |
| 6,420,968 | B1 | 7/2002 | Hirsch | 340/506 |
| 6,445,782 | B1 | 9/2002 | Elfe et al. | 379/201.01 |
| 6,449,253 | B1 | 9/2002 | Ott | 370/231 |
| 6,477,566 | B1 | 11/2002 | Davis et al. | 709/223 |
| 6,477,568 | B2 | 11/2002 | Borrett et al. | 709/223 |
| 6,480,718 | B1 | 11/2002 | Tse | 455/446 |
| 6,490,621 | B1 | 12/2002 | Forget et al. | 709/224 |
| 6,522,883 | B2 | 2/2003 | Titmuss et al. | 455/445 |
| 6,529,877 | B1 | 3/2003 | Murphy et al. | 705/7 |
| 6,539,221 | B1 | 3/2003 | Vasudevan et al. | 455/423 |
| 6,560,204 | B1 | 5/2003 | Rayes | 370/253 |
| 6,563,795 | B1 | 5/2003 | Gruber et al. | 370/248 |
| 6,574,661 | B1 | 6/2003 | Delano | |
| 6,578,005 | B1 | 6/2003 | Lesaint et al. | 705/8 |
| 6,584,502 | B1 * | 6/2003 | Natarajan et al. | 709/224 |
| 6,600,749 | B1 | 7/2003 | Hayball et al. | 370/400 |
| 6,611,863 | B1 * | 8/2003 | Banginwar | 709/223 |
| 6,628,952 | B1 | 9/2003 | Hankins et al. | 455/446 |
| 6,643,695 | B1 * | 11/2003 | Takagi et al. | 709/224 |
| 6,643,837 | B2 | 11/2003 | Campbell et al. | 716/12 |
| 6,684,247 | B1 | 1/2004 | Santos et al. | 709/242 |
| 6,704,287 | B1 | 3/2004 | Moharram | 370/242 |
| 6,707,795 | B1 | 3/2004 | Noorhosseini et al. | 370/242 |
| 6,728,688 | B1 | 4/2004 | Hirsch et al. | 706/11 |
| 6,744,739 | B2 | 6/2004 | Martin | 370/254 |
| 6,766,165 | B2 | 7/2004 | Sharma et al. | 455/423 |
| 6,766,364 | B2 | 7/2004 | Moyer et al. | 709/221 |
| 6,769,024 | B1 * | 7/2004 | Natarajan et al. | 709/224 |
| 6,771,873 | B2 | 8/2004 | Premaratne et al. | 385/147 |
| 6,802,044 | B2 | 10/2004 | Campbell et al. | 716/2 |
| 6,810,419 | B1 | 10/2004 | Bogler et al. | 709/224 |
| 6,823,291 | B2 * | 11/2004 | Marsland | 702/188 |
| 6,832,074 | B2 | 12/2004 | Borras-Chia et al. | 455/67.13 |
| 6,836,466 | B1 | 12/2004 | Kant et al. | 370/252 |
| 6,836,748 | B2 | 12/2004 | Stupp | 702/183 |
| 6,842,463 | B1 | 1/2005 | Drwiega et al. | 370/468 |
| 6,857,014 | B1 | 2/2005 | Paterson et al. | 709/223 |
| 6,862,291 | B2 | 3/2005 | Talpade et al. | 370/412 |
| 6,865,151 | B1 | 3/2005 | Saunders | 370/230 |
| 6,882,657 | B1 | 4/2005 | Werner et al. | 370/437 |
| 6,892,169 | B1 | 5/2005 | Campbell et al. | 703/1 |
| 6,910,074 | B1 | 6/2005 | Amin et al. | |
| 6,914,881 | B1 | 7/2005 | Mansfield et al. | 370/230 |
| 6,944,631 | B2 | 9/2005 | Peter | 707/104.1 |
| 6,978,301 | B2 * | 12/2005 | Tindal | 709/223 |
| 6,996,510 | B1 | 2/2006 | Reilly et al. | 703/13 |
| 7,043,661 | B2 | 5/2006 | Valadarsky et al. | 714/4 |
| 7,051,087 | B1 * | 5/2006 | Bahl et al. | 709/220 |
| 7,155,479 | B2 * | 12/2006 | Cover et al. | 709/203 |
| 7,278,056 | B2 * | 10/2007 | Hekmatpour | 714/37 |
| 7,320,090 | B2 * | 1/2008 | Coulter et al. | 714/30 |
| 7,552,339 | B2 * | 6/2009 | Sayama | 713/186 |
| 7,610,361 | B2 * | 10/2009 | Manthoulis et al. | 709/220 |
| 7,610,381 | B2 * | 10/2009 | Cherkasova et al. | 709/226 |
| 2001/0051503 | A1 | 12/2001 | Lush | 455/2.01 |
| 2002/0069274 | A1 * | 6/2002 | Tindal et al. | 709/223 |
| 2002/0091588 | A1 | 7/2002 | Benton et al. | 705/27 |
| 2002/0103850 | A1 | 8/2002 | Moyer et al. | 709/202 |
| 2002/0103898 | A1 | 8/2002 | Moyer et al. | 709/224 |
| 2002/0114309 | A1 | 8/2002 | Chow et al. | 370/347 |
| 2002/0120733 | A1 | 8/2002 | Kring | 709/223 |
| 2002/0124091 | A1 | 9/2002 | Kurose et al. | 709/228 |
| 2002/0131374 | A1 | 9/2002 | Lee | 370/254 |
| 2002/0194323 | A1 * | 12/2002 | Chantrain et al. | 709/223 |
| 2003/0061068 | A1 * | 3/2003 | Curtis | 705/1 |
| 2003/0115028 | A1 | 6/2003 | Summerfield et al. | 703/6 |
| 2003/0140142 | A1 | 7/2003 | Marples et al. | 709/225 |
| 2003/0179703 | A1 * | 9/2003 | Levy et al. | 370/230 |
| 2003/0185205 | A1 | 10/2003 | Beshai | 370/370 |
| 2004/0081161 | A1 | 4/2004 | Held et al. | 370/395.3 |
| 2004/0083235 | A1 * | 4/2004 | Shah et al. | 707/104.1 |
| 2004/0095914 | A1 | 5/2004 | Katsube et al. | 370/338 |
| 2004/0107085 | A1 | 6/2004 | Moosburger et al. | 703/13 |
| 2004/0117613 | A1 * | 6/2004 | Edmondson | 713/150 |
| 2004/0146008 | A1 | 7/2004 | Conradt et al. | 370/241 |
| 2004/0153171 | A1 * | 8/2004 | Brandt et al. | 700/9 |
| 2004/0165562 | A1 | 8/2004 | Elaoud et al. | 370/338 |
| 2004/0172412 | A1 * | 9/2004 | Files et al. | 707/104.1 |
| 2004/0240385 | A1 | 12/2004 | Boggs et al. | 370/230 |
| 2004/0243716 | A1 | 12/2004 | Ryll | 709/232 |
| 2004/0259565 | A1 | 12/2004 | Lucidarme | 455/453 |
| 2005/0010468 | A1 | 1/2005 | Power | 705/10 |
| 2005/0076339 | A1 | 4/2005 | Merril et al. | 718/104 |
| 2005/0132027 | A1 | 6/2005 | Vicente et al. | 709/220 |
| 2005/0177629 | A1 * | 8/2005 | Betge-Brezetz et al. | 709/223 |
| 2005/0198229 | A1 * | 9/2005 | Casteel | 709/221 |
| 2005/0198581 | A1 | 9/2005 | Soderberg et al. | 715/770 |
| 2005/0202811 | A1 | 9/2005 | Abed et al. | 455/426.2 |
| 2005/0264831 | A1 * | 12/2005 | Sayama | 358/1.1 |
| 2005/0278453 | A1 | 12/2005 | Cherkasova | 709/231 |
| 2005/0278576 | A1 * | 12/2005 | Hekmatpour | 714/37 |
| 2005/0283664 | A1 * | 12/2005 | Coulter et al. | 714/15 |
| 2006/0075093 | A1 | 4/2006 | Frattura et al. | 709/224 |
| 2006/0075102 | A1 * | 4/2006 | Cupit | 709/225 |
| 2006/0155865 | A1 | 7/2006 | Brandt et al. | 709/230 |
| 2007/0027964 | A1 * | 2/2007 | Herrod et al. | 709/220 |
| 2007/0118643 | A1 * | 5/2007 | Mishra et al. | 709/224 |
| 2008/0065687 | A1 * | 3/2008 | Coulter et al. | 707/102 |
| 2008/0065931 | A1 * | 3/2008 | Coulter et al. | 714/37 |
| 2008/0172366 | A1 * | 7/2008 | Hannel et al. | 707/3 |
| 2009/0187969 | A1 * | 7/2009 | DeFord et al. | 726/3 |

FOREIGN PATENT DOCUMENTS

| | | |
|---|---|---|
| CA | 2 405 263 A1 | 10/2001 |
| CA | 2 401 714 A1 | 5/2003 |
| CA | 2 489 304 A1 | 11/2004 |
| CA | 2 451 947 A1 | 6/2005 |
| CH | 686 540 A5 | 4/1996 |
| CH | 691 419 A5 | 7/2001 |
| DE | 40 41 442 C1 | 6/1992 |
| DE | 42 42 808 A1 | 6/1994 |
| DE | 197 40 718 A1 | 9/1999 |
| DE | 198 21 461 A1 | 11/1999 |
| DE | 199 16 632 A1 | 4/2000 |
| DE | 199 24 988 A1 | 12/2000 |
| DE | 101 58 080 A1 | 6/2003 |
| DE | 102 10 742 A1 | 10/2003 |
| DE | 102 26 315 A1 | 1/2004 |
| DE | 103 00 709 A1 | 8/2004 |
| DE | 103 11 697 A1 | 10/2004 |
| DE | 103 18 292 A1 | 11/2004 |
| DE | 103 37 464 A1 | 12/2004 |
| DE | 103 38 053 A1 | 3/2005 |
| EP | 0 673 135 A1 | 3/1994 |
| EP | 0 619 682 A2 | 10/1994 |
| EP | 0 762 712 A2 | 3/1997 |
| EP | 0 847 213 A2 | 6/1998 |
| EP | 0 854 607 A1 | 7/1998 |
| EP | 0 899 910 A2 | 3/1999 |
| EP | 0 899 911 A2 | 3/1999 |
| EP | 0 899 912 A2 | 3/1999 |
| EP | 0 899 913 A2 | 3/1999 |
| EP | 0 914 016 A2 | 5/1999 |
| EP | 0 923 269 A2 | 6/1999 |
| EP | 0 923 270 A2 | 6/1999 |
| EP | 0 963 077 A2 | 12/1999 |
| EP | 0 977 460 A2 | 2/2000 |
| EP | 1 026 867 A2 | 8/2000 |
| EP | 1 043 871 A2 | 10/2000 |
| EP | 1 091 614 A2 | 4/2001 |
| EP | 1 098 245 A1 | 5/2001 |
| EP | 1 102 433 A2 | 5/2001 |
| EP | 1 109 413 A1 | 6/2001 |
| EP | 1 111 840 A2 | 6/2001 |
| EP | 1107108 | 6/2001 |
| EP | 1 150 455 A2 | 10/2001 |
| EP | 1 172 967 A2 | 1/2002 |
| EP | 1 221 667 A1 | 7/2002 |
| EP | 1 231 739 A1 | 8/2002 |
| EP | 1 298 505 A1 | 4/2003 |
| EP | 1 298 838 A1 | 4/2003 |
| EP | 1 298 839 A1 | 4/2003 |
| EP | 1 298 840 A1 | 4/2003 |
| EP | 1 313 261 A1 | 5/2003 |
| EP | 1 326 370 A1 | 7/2003 |
| EP | 1 326 453 A1 | 7/2003 |
| EP | 0 943 196 B1 | 11/2003 |
| EP | 1 378 841 A1 | 1/2004 |
| EP | 1 398 905 A1 | 3/2004 |
| EP | 1 401 146 A1 | 3/2004 |
| EP | 1 437 859 A1 | 7/2004 |
| EP | 1 445 909 A1 | 8/2004 |
| EP | 1 460 798 A1 | 9/2004 |
| EP | 1 460 859 A1 | 9/2004 |
| EP | 1 460 860 A1 | 9/2004 |
| EP | 1 467 516 A1 | 10/2004 |
| EP | 1 533 940 A1 | 5/2005 |
| GB | 2 318 478 A | 4/1998 |
| GB | 2 319 710 A | 5/1998 |
| GB | 2 332 832 A | 6/1999 |
| GB | 2 338 860 A | 12/1999 |
| GB | 2 344 963 A | 6/2000 |
| GB | 2374687 A | 10/2002 |
| GB | 2 393 606 A | 3/2004 |
| GB | 2403628 A | 1/2005 |
| GB | 2408652 A | 6/2005 |
| GB | 2431067 | 5/2008 |
| GB | 2 432 992 | 9/2008 |
| WO | 94/11970 | 5/1994 |
| WO | 95/23482 | 8/1995 |
| WO | 96/42173 | 12/1996 |
| WO | 97/23101 | 6/1997 |
| WO | 98/29992 | 7/1998 |
| WO | 98/30061 | 7/1998 |
| WO | 98/33334 | 7/1998 |
| WO | 98/47307 | 10/1998 |
| WO | 98/53399 | 11/1998 |
| WO | WO 98/52322 | 11/1998 |
| WO | 99/00965 | 1/1999 |
| WO | 99/03245 | 1/1999 |
| WO | 99/09489 | 2/1999 |
| WO | 99/17194 | 4/1999 |
| WO | 99/22491 | 5/1999 |
| WO | 99/37102 | 7/1999 |
| WO | 99/63777 | 12/1999 |
| WO | 00/08569 | 2/2000 |
| WO | 00/26743 | 5/2000 |
| WO | 00/36788 | 6/2000 |
| WO | 00/57597 | 9/2000 |
| WO | 01/03374 A1 | 1/2001 |
| WO | 01/03378 A1 | 1/2001 |
| WO | 01/13595 A1 | 2/2001 |
| WO | 01/24448 A1 | 4/2001 |
| WO | 01/25991 A1 | 4/2001 |
| WO | 01/29663 A1 | 4/2001 |
| WO | 01/29722 A2 | 4/2001 |
| WO | 01/35576 A2 | 5/2001 |
| WO | 01/47148 A2 | 6/2001 |
| WO | 01/54350 A2 | 7/2001 |
| WO | 01/54376 A3 | 7/2001 |
| WO | 01/54425 A2 | 7/2001 |
| WO | 01/55854 A1 | 8/2001 |
| WO | 01/58189 A1 | 8/2001 |
| WO | 01/69466 A1 | 9/2001 |
| WO | 01/72056 A2 | 9/2001 |
| WO | 01/74043 A3 | 10/2001 |
| WO | 01/75589 A2 | 10/2001 |
| WO | 01/75669 A1 | 10/2001 |
| WO | 01/75701 A1 | 10/2001 |
| WO | 01/75702 A1 | 10/2001 |
| WO | 01/75703 A1 | 10/2001 |
| WO | 01/75704 A1 | 10/2001 |
| WO | 01/76267 A1 | 10/2001 |
| WO | 01/84329 A1 | 11/2001 |
| WO | 01/84331 A1 | 11/2001 |
| WO | 01/84787 A1 | 11/2001 |
| WO | 01/89141 A2 | 11/2001 |
| WO | 01/91369 A2 | 11/2001 |
| WO | 02/06918 A2 | 1/2002 |
| WO | 02/13034 A1 | 2/2002 |
| WO | 02/17526 A2 | 2/2002 |
| WO | 02/23804 A2 | 3/2002 |
| WO | 02/46927 A2 | 6/2002 |
| WO | 02/47325 A2 | 6/2002 |
| WO | 02/47326 A2 | 6/2002 |
| WO | 02/47332 A2 | 6/2002 |
| WO | 02/47333 A2 | 6/2002 |
| WO | 02/056249 A2 | 7/2002 |
| WO | 02/058407 A2 | 7/2002 |
| WO | 02/065726 A2 | 8/2002 |
| WO | 02/071691 A2 | 9/2002 |
| WO | 02/075651 A2 | 9/2002 |
| WO | 02/078363 A1 | 10/2002 |
| WO | 02/080055 A2 | 10/2002 |
| WO | 02/103959 A2 | 12/2002 |
| WO | 03/007546 A2 | 1/2003 |
| WO | 03/009160 A1 | 1/2003 |
| WO | 03/012704 A1 | 2/2003 |
| WO | 03/017571 A2 | 2/2003 |
| WO | 03/021415 A1 | 3/2003 |
| WO | 03/021468 A1 | 3/2003 |
| WO | 03/023665 A1 | 3/2003 |
| WO | 03/027910 A1 | 4/2003 |
| WO | 03/039070 A2 | 5/2003 |
| WO | 03/039082 A1 | 5/2003 |
| WO | 03/041325 A2 | 5/2003 |
| WO | 03/041340 A1 | 5/2003 |
| WO | 03/043262 A1 | 5/2003 |
| WO | WO 03/041340 A1 | 5/2003 |
| WO | 03/046752 A1 | 6/2003 |

| | | | |
|---|---|---|---|
| WO | 03/046781 A1 | 6/2003 |
| WO | 03/053075 A2 | 6/2003 |
| WO | 03/055143 A1 | 7/2003 |
| WO | 03/081556 A1 | 10/2003 |
| WO | 03/081844 A1 | 10/2003 |
| WO | 03/084198 A1 | 10/2003 |
| WO | 03/091918 A1 | 11/2003 |
| WO | 03/098462 A1 | 11/2003 |
| WO | 03/102829 A1 | 12/2003 |
| WO | 2004/002172 A1 | 12/2003 |
| WO | 2004/004214 A | 1/2004 |
| WO | 2004/006507 A2 | 1/2004 |
| WO | 2004/008283 A2 | 1/2004 |
| WO | 2004/008689 A1 | 1/2004 |
| WO | 2004/008783 A1 | 1/2004 |
| WO | WO 2004/008283 | 1/2004 |
| WO | WO 2004/010631 | 1/2004 |
| WO | WO2004/010631 A3 | 1/2004 |
| WO | 2004/023719 A2 | 3/2004 |
| WO | 2004/027580 A2 | 4/2004 |
| WO | 2004/032447 A2 | 4/2004 |
| WO | 2004/045142 A1 | 5/2004 |
| WO | 2004/047325 A1 | 6/2004 |
| WO | 2004/064322 A1 | 7/2004 |
| WO | 2004/088443 A1 | 10/2004 |
| WO | 2004/107790 A1 | 12/2004 |
| WO | 2005/013142 A1 | 2/2005 |
| WO | 2005/017707 A2 | 2/2005 |
| WO | 2005/034428 A2 | 4/2005 |
| WO | 2005/067223 A1 | 7/2005 |
| WO | 2005/071900 A1 | 8/2005 |

OTHER PUBLICATIONS

Search and Examination Report from Patent Application No. GB0523543.7 mailed Nov. 23, 2007.
Non-Final Office Action from U.S. Appl. No. 12/094,265, dated May 28, 2010.
Final Office Action from U.S. Appl. No. 12/094,265, dated Jan. 5, 2011.
Written Opinion from International Application No. PCT/GB2006/004298, dated Jun. 1, 2007.
Examination Report from UK Application No. GB0811137.9, dated May 10, 2010.
Examination Report from UK Application No. GB0811137.9, dated Dec. 1, 2010.

* cited by examiner

METHOD AND SYSTEM FOR TELECOMMUNICATIONS NETWORK PLANNING AND MANAGEMENT

RELATED APPLICATIONS

This application claims a benefit of priority under 35 U.S.C. §119 to GB Patent Application No. 0523543.7 by Richard Mishra, Markus Buchner, Johnston Glendinning, Manfred Geyer and Adan Pope entitled "Network Planning" filed on Nov. 18, 2005, the entire contents of which are hereby expressly incorporated by reference for all purposes.

TECHNICAL FIELD OF THE INVENTION

The present invention relates to management and/or modeling of telecommunications services, and in particular, to methods and apparatus for processing service information relating to a plurality of user services available in a telecommunications system. More particularly, the present invention relates to network management and planning. Even more particularly, particular aspects relate to a method of performing network modification in a telecommunications network, a method of managing a telecommunications network and a method of generating planning data defining changes to a telecommunications network.

BACKGROUND OF THE INVENTION

The management and planning of a telecommunications network is often supported by a data model which models the telecommunications network, and is also often referred to as an inventory. However, the data in the data model is often inaccurate and does not provide a clear view of the actual installed network. This can affect the quality of planning decisions, and lead to the construction of inefficient networks. Without an accurate model automation of service provisioning can also be more difficult.

Planning decisions are also often based on the analysis of high-level service requirements, from which optimized network configurations are derived. However, it is often difficult to adapt existing network structures to conform to these optimized configurations without simply replacing the existing network structures, which is typically not feasible. Physical movement of equipment is also expensive and can cause damage to the equipment. Many telecommunications operators hence prefer to avoid physical restructuring of existing network resources.

The present invention seeks to alleviate some of these problems.

SUMMARY OF THE INVENTION

Accordingly, in a first aspect of the invention, there is provided a method of performing network modification in a telecommunications network, comprising: storing a database comprising a master inventory defining network resources available in the network; and performing a network modification by a process comprising: modifying the database storing the master inventory; and modifying the network in dependence on the modified database.

In this way, a system can be provided in which changes in the actual network are made in response to changes to the inventory (preferably always or at least in normal circumstances, possibly not including emergency repairs or modifications). An inventory can thus be provided which reflects the state of the actual network more accurately, and which can allow for more reliable planning decisions and changes to the network. The inventory can also enable service provisioning processes to be automated more effectively.

The term 'telecommunications network' preferably refers to a network of interconnected devices (and possibly associated software) which provides telecommunications services. Optionally, other types of services may additionally be provided by or using the telecommunications network, for example data processing, storage, and retrieval services. Examples of such services include a mailbox, web space, an interactive travel booking system, a multimedia content delivery system or an online game. Such additional services are particular relevant in "next-generation" networks. Instead of a telecommunications network, the invention may also be applied to any suitable type of communications system or information processing system in which communication functionality or services are provided using distributed interconnected devices, for example in a local area network (LAN).

The master inventory may define network resources which exist in the network and are available for use, and may additionally define planned network resources which do not yet physically exist in the network or are not connected or configured for use.

Preferably, performing the network modification further comprises: outputting a change record describing the modification made to the database; and modifying the network using the change record. This can provide a reliable mechanism for controlling changes to the network.

The method may comprise collating a plurality of change records describing modifications to the database to generate a network modification plan, the network modification plan defining multiple network changes, and modifying the network using the modification plan. This can enable more efficient network modification by grouping multiple changes. The changes may be grouped based on a number of factors, including the type of equipment to which a change relates and/or the network location at which the change is to be performed. Using the latter criterion, network modifications can be grouped based on location, so that, for example, the modifications can be performed in a single visit to the location.

The network modification preferably comprises addition and/or deletion of one or more network resources to and/or from the network. The database preferably stores elements representing network resources; and modifying the database preferably comprises adding, deleting or modifying one or more database elements in the database.

The method may further comprise: storing a service inventory, the service inventory being derived from the master inventory and containing information used for the provisioning of services in the network; and provisioning services in the network using the service inventory. This can allow service provisioning (typically a more frequent activity) to be performed separately of network design and planning, which can lead to improved reliability. Preferably, the service inventory includes only such information as is required to perform service-provisioning and related tasks.

Provisioning a service preferably comprises: modifying the service inventory in dependence on the service being provisioned; and configuring the network to provide the service in dependence on the modified service inventory. This can ensure that the service inventory reflects provisioned services more accurately and can allow for more sophisticated provisioning processes. Provisioning the service preferably comprises generating configuration information in dependence on the service inventory modification, and transmitting the configuration information to one or more network resources in the network to configure the network resources to provide the service.

The method preferably comprises updating the service inventory in response to changes in the master inventory. In this way, the service inventory can be kept up-to-date.

In a further aspect of the invention, there is provided a method of managing a telecommunications network comprising: storing a database comprising a master inventory defining network resources available in the network; storing a database comprising a service inventory, the service inventory being derived from the master inventory and containing information used for the provisioning of services in the network; and modifying the service inventory in response to modification of the master inventory. This can allow network design/planning and service provisioning to be performed independently, whilst ensuring that both use an accurate data model.

The method preferably comprises modifying the network by a process including: modifying the master inventory; generating change information in response to modification of the master inventory; and modifying the network in dependence on the change information. The method preferably comprises provisioning a service in the network by a process including: modifying the service inventory; generating configuration information in response to the modification of the service inventory; and transmitting the configuration information to the network. The method may comprise receiving a service order relating to a service, and provisioning the service using the service inventory in response to the order.

Preferably, the method comprises analyzing utilization of network resources in the network, and planning changes to the network in dependence on the outcome of the analysis. Analyzing and planning preferably comprises: measuring the utilization of one or more network resources in the network over time; analyzing the measured utilization over time of the one or more network resources to determine a utilization trend; predicting future utilization of the one or more network resources using the determined utilization trend; and planning changes to the network in dependence on the predicted future utilization.

This feature is also provided independently. Accordingly, in a further aspect of the invention, there is provided a method of generating planning data defining changes to a telecommunications network, comprising: measuring the utilization of one or more network resources in the network over time; analyzing the measured utilization over time to determine a utilization trend; calculating a predicted future utilization of the one or more network resources using the determined utilization trend; and generating planning data defining changes to the network in dependence on the predicted future utilization of the one or more network resources. This can enable higher-quality planning data to be generated, which is derived using information on the actual network and the utilization of actual network resources. A planning process can thus be provided which is driven by the actual (existing) network, rather than high-level, abstract service requirements. This can lead to the planning of network changes which can be more easily implemented in the existing network.

The one or more resources are preferably associated with a given network location; the planning data defining changes to the network at the network location. Alternatively or additionally, the one or more resources may be associated with connection resources between network locations; the planning data defining changes to the connection resources.

The term 'network location' preferably refers to a location or area where a specified portion of the network is located, for example a geographical area such as a town or city, or a location where network equipment and connections are provided, such as a building or building complex, or a floor or room in a building. For example, an exchange may be a network location. A network location may also be a logical grouping of network resources. A network typically includes a plurality of such network locations, interconnected in some way.

The method preferably comprises calculating a measure of the predicted demand for a type of network resource in dependence on the predicted utilization; and generating the planning data in dependence on the predicted demand. The measure of the predicted demand for a type of resource is preferably calculated in dependence on the predicted utilization of the one or more resources and in dependence on one or more adjustment parameters. This can provide greater flexibility.

The one or more adjustment parameters may comprise one or more of: a global adjustment factor, a local adjustment factor, and a service trend adjustment factor. The method preferably comprises analyzing service data relating to services provided using the one or more network resources or the network location over time to determine a service trend; and determining the service trend adjustment factor in dependence on the service trend. In this way, higher-level service requirements can still be taken into account in a network driven planning process.

The global adjustment factor may relate to external conditions relevant to the network, for example general economic conditions. The local adjustment factor may relate to conditions local to a geographical area or population of an area and/or local to a portion of the network including the one or more network resources and/or the network location. The planning data may define one or more modifications, additions and/or removals of network resources in the network.

The invention also provides a method of performing network modification in a telecommunications network comprising generating planning data defining changes to the network using a method as described above, and performing network modification in dependence on the planning data. The network modification may be performed using a method as described above. The above methods (as well as those set out below) may be combined in any other suitable way.

In a further aspect of the invention, there is provided a method of managing a telecommunications network, comprising: maintaining a master inventory defining network resources available in the network; and implementing changes to the network by: implementing the changes in the master inventory; and translating the inventory changes into changes to the network.

In a further aspect of the invention, there is provided a method of managing a telecommunications network comprising: maintaining a master inventory describing network resources available in the network; maintaining a service inventory, the service inventory being derived from the master inventory and containing information used for the provisioning of services in the network; and updating the service inventory in response to changes in the master inventory.

In a further aspect of the invention, there is provided a method of planning changes to a telecommunications network, comprising: measuring the utilization of one or more network resources in the network over time; analyzing the measured utilization over time to determine a utilization trend; predicting future utilization of the one or more network resources using the determined utilization trend; and planning changes to the network in dependence on the predicted future utilization of the one or more network resources.

In a further aspect of the invention, there is provided a method of generating planning data defining planned changes to a telecommunications network, comprising: representing the network in an abstract representation as a plurality of capability objects, each capability object representing a network capability; and generating planning data specifying changes to network capabilities, the changes being expressed in the planning data at a level of abstraction corresponding to that of the abstract representation.

This can enable more effective planning of network changes which does not rely on a detailed network model. Planning decisions can be expressed in more abstract terms, allowing their implementation to be determined separately by a resource planner.

Network capabilities may, for example, include groupings of network resources and/or network functions, technical or functional characteristics of parts of a network, and/or services and functions providable by a network or by part of a network. Network capabilities are preferably represented independently of the network resources which provide the capabilities.

The changes may be expressed in the planning data in terms of or in terms corresponding to the abstract representation. Thus, the changes are preferably expressed in terms of the capabilities represented (or representable) in the abstract representation. For example, the planning data may specify the addition, modification and/or removal of network capabilities. The terms "change" and "modification" (and related terms) are herein meant to encompass the addition of new capabilities or resources as well as the modification or deletion of existing capabilities or resources (or of representations thereof in a model or database), unless the context otherwise requires.

The abstract representation is preferably in the form of an abstract network model (also referred to herein as a planning model or capability plan), preferably stored in a database. The term "object" is used here in a general sense to refer to a representational unit or entity. Capability objects may be represented using database entities such as database tables (in a relational database) or database objects (in an object database), depending on the type of database used.

The method preferably comprises modifying the abstract representation in dependence on the planning data. This may involve adding, modifying or changing capability objects so as to reflect the planned changes. Preferably, the method comprises translating the planning data specifying changes to network capabilities at the abstract level into detailed planning data specifying network changes for implementing the capability changes. The detailed planning data may specify addition or removal of or changes to network resources (for example network equipment) in the network (or in a network model).

The method preferably further comprises storing a model of the network, the model defining network resources of the network; and modifying the network model in dependence on the planning data. The model is preferably more detailed than the abstract representation (i.e. at a lower level of abstraction), and preferably represents network resources of the network, for example network equipment and connections between equipment.

The method may further comprise storing a plurality of templates each defining changes to the network model, selecting a template in dependence on the planning data, and modifying the network model using the template. The use of templates can allow for more efficient and controlled implementation of planning requirements in the network model. A given template may be associated with one or more parameters, in which case values for the parameters are preferably derived from the planning data. Parameterisable templates can provide greater flexibility.

The method preferably comprises implementing the network changes in the network in dependence on the modifications made to the network model. This can ensure that correspondence is maintained between the network model and the actual installed network.

Capability objects may represent one or more of: partitions of network resources of the network, for example network domains, network areas, network locations, or equipment sites; physical characteristics of locations or sites; and technological capabilities or logical capabilities available at locations or sites or connecting locations or sites. Technological and logical capabilities may also be viewed as representing partitions of network resources (i.e. technological/logical rather than geographic partitions).

Preferably, the abstract representation comprises a hierarchy of capability objects representing a hierarchical partitioning of network resources of the network (for example, a network location comprising one or more equipment sites each comprising one or more technological capabilities). This can simplify planning and enable more efficient implementation of planned changes. The abstract representation preferably does not directly represent low-level network resources such as pieces of network equipment or specific connections. More generally, the abstract representation preferably comprises only such information as is needed for performing planning tasks (i.e. data is held only at a level of detail needed to support network planning).

The term "network resource" preferably refers to tangible/physical or low-level logical/technological entities (rather than high-level conceptual entities) from which a network is constructed, including, for example, pieces of equipment, devices, components for devices (e.g. cards), facilities of devices or subdivisions thereof (e.g. ports), groups or associations of equipment or devices, connections (e.g. cables), support structures (e.g. ducts), software executing on devices, or low-level logical entities (e.g. timeslots, files or other storage space assignments).

The invention also provides a planning system for generating planning data defining planned changes to a telecommunications network, comprising: a database storing a planning model representing the network using a plurality of capability objects, each capability object representing a network capability; and a planning module adapted to generate planning data specifying changes to network capabilities in dependence on the planning model.

Also provided are a network management system or network planning system adapted to perform a method as described herein, apparatus comprising means for performing a method as described herein and a computer program or computer program product comprising software code adapted, when executed on a data processing apparatus, to perform a method as described herein.

More generally, the invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale. Preferred features of the present invention will now be described, purely by way of example, with reference to the accompanying drawings, in which.

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure. Reference is now made in detail to the exemplary embodiments of the invention, examples of which are illustrated in the accompanying drawings. Wherever possible, the same reference numbers will be used throughout the drawings to refer to the same or like parts (elements).

Figure 1:
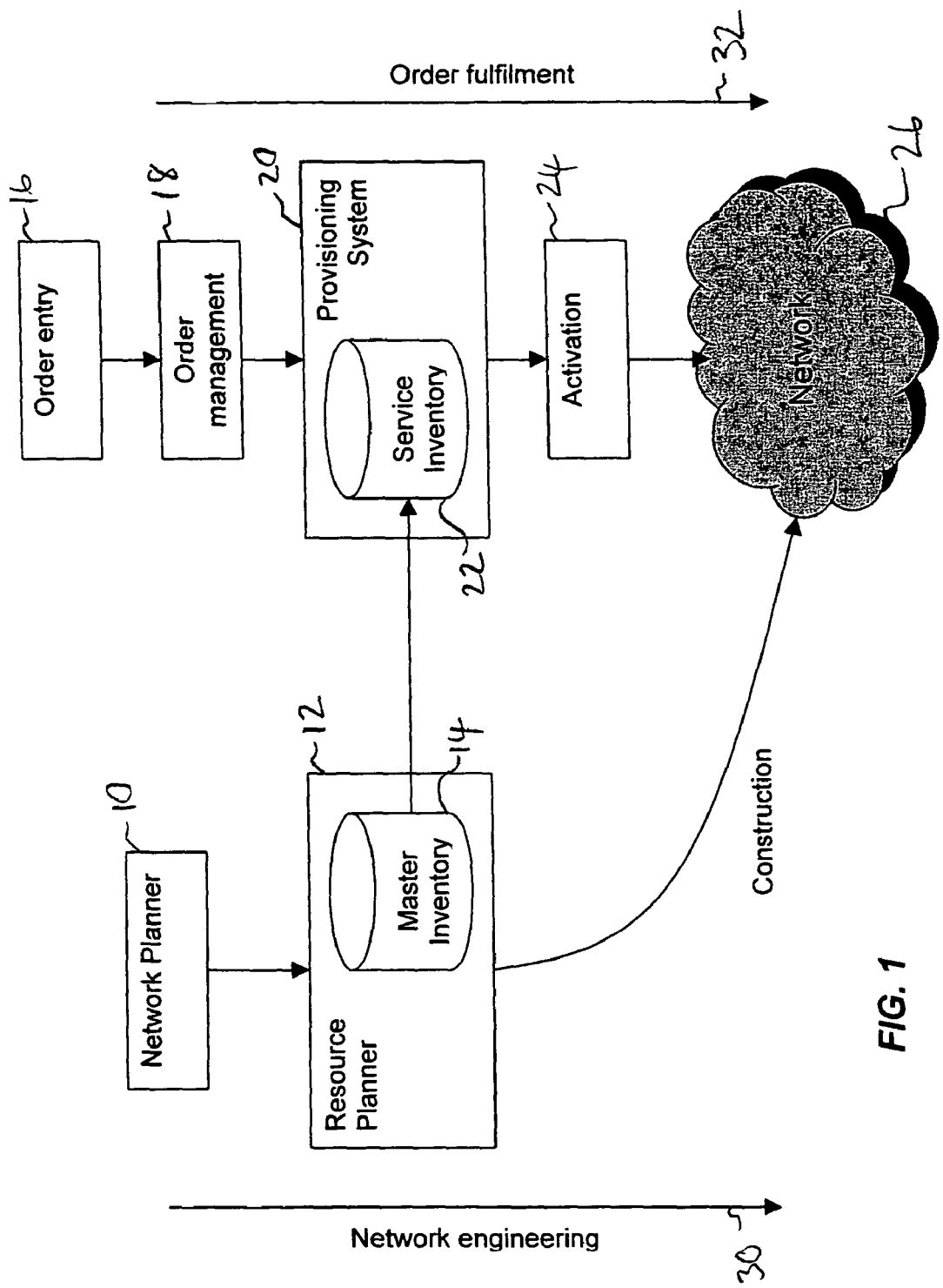
FIG. 1 illustrates a network management system in overview, including network engineering and order fulfillment processes.

FIG. 1 shows in overview a network management system for managing a telecommunications network 26.

The network management system provides facilities for carrying out two distinct management processes: a network engineering process and a service order fulfillment process. The network engineering process includes the planning, design, and physical construction of the network. The order fulfillment process includes the provisioning of services to users of the network in response to service orders.

Underlying these processes is a master inventory 14. The master inventory 14 provides a representation or model of the network which supports the various processes outlined above. Specifically, the inventory stores information defining the network resources available in network 26, including network devices, connections between network devices, and features and characteristics of devices and connections. The inventory may also store information defining planned resources, i.e. resources which do not yet physically exist in the network or are not connected or configured for use, but which are intended to be added to the network. In preferred embodiments, the master inventory (also referred to as the resource inventory) stores sufficient detail, but no more detail than required, to carry out its two primary tasks: firstly to allow the specification of changes to the network that will be implemented by physical planning and construction processes (either internally, by device vendors, or by other suppliers); secondly, to populate the service inventory 22 (described below) with network data, so that the service inventory is able to build service specific inventory data on top of the network data and so enable service provisioning in the inventory.

The inventory is managed by a resource planner 12. Resource planner 12 controls changes to the inventory, for example the addition or removal of network resources.

A network planning module 10 interacts with the resource planner 12 and provides functions for supporting the planning of the network, principally by analyzing information held in the inventory and identifying changes to the network needed to enable the network to meet future demand. The network planning module 10 interacts with the resource planner 12 to implement the changes.

Any changes made to the master inventory 14 are translated into changes to the actual network 26. These changes are typically physical changes, such as the installation of new equipment or connections. The planning and construction functions together form the network engineering process represented by arrow 30 in FIG. 1.

The order fulfillment process is represented by arrow 32.

To support the order fulfillment process, an order entry module 16, an order management module 18, a provisioning subsystem 20 and an activation module 24 are provided.

Service orders are received by the order entry module 16, which may, for example comprise an interactive order entry application. Service orders are then processed by order management module 18, which identifies the specific services that need to be provisioned in response to a given order, and carries out other associated functions (such as billing), in some cases by interaction with external systems. Once the relevant services have been identified, the order management system instructs the provisioning system 20 to provision those services in the network.

The service provisioning system 20 is responsible for provisioning services to users of the network 26. The provisioning system 20 maintains a service inventory 22 used for provisioning services in the network. The service inventory 22 is derived from the master inventory 14, but typically contains only the information from the master inventory 14 that is needed to enable the provisioning of services and the management of provisioned services. The service inventory 22 typically also contains additional information not present in the master inventory to support the provisioning processes.

To provision a service, the provisioning system 20 identifies network resources in the service inventory 22 which can be used to provide the service, generates network configuration information for configuring the identified network resources to provide the service, and updates the service inventory 22 to reflect the new service. The configuration information is passed to activation module 24 which generates device-specific configuration instructions and transmits these to the network to set up the new service.

Figure 2:
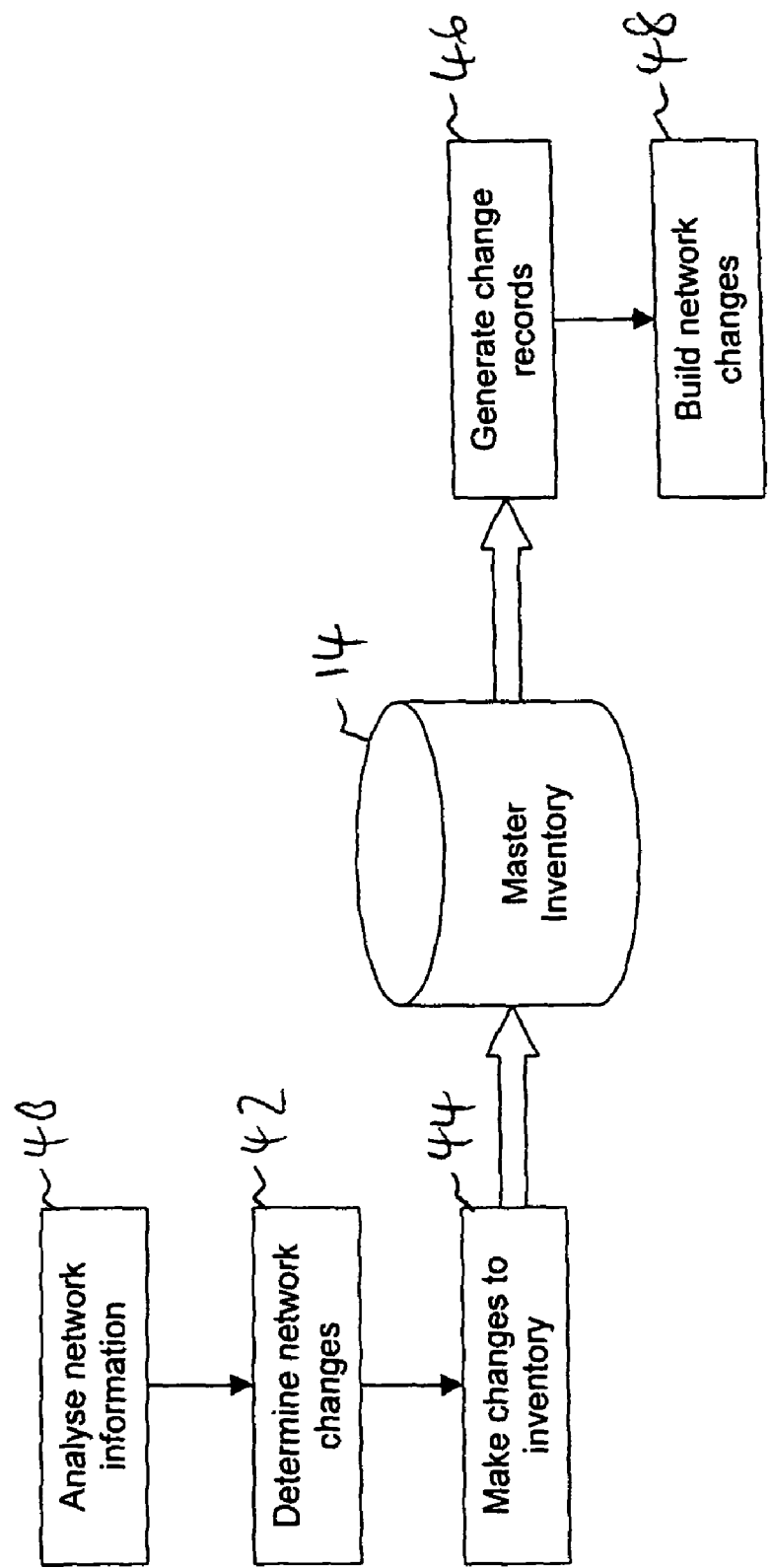
FIG. 2 illustrates the network engineering process in greater detail.

The network engineering process 30 is illustrated in more detail in FIG. 2.

Information about the network is obtained and analyzed in step 40. This information typically includes information obtained from the master inventory 14, but may also include other information, such as service data and external data. In some embodiments the information is provided by a separate, abstract, planning model (described in more detail below). The analysis results in the identification of requirements for the network.

In step 42, changes to the network are determined to support the identified requirements. These changes are implemented in the inventory 14 in step 44.

In response to changes in the inventory 14, change records are generated in step 46. These change records define the changes which need to be made to the network to ensure that the network corresponds to the network model of the inventory 14. The change records are used to implement the changes in the network in step 48.

The changes typically include the addition of new network resources (e.g. network devices or physical connections between devices) to the network 26 as well as (less frequently) the removal of existing network resources from the network 26. This process of maintaining and changing the physical network is referred to herein as network construction.

In normal circumstances, the physical network is thus modified only in response to modification of the inventory 14. In this way, it can be ensured that the master inventory 14 maintains an accurate model of the network and can thus serve to reliably support other operational processes. The inventory 14 is, in effect, master of the network in the present system, unlike many prior art systems where a network model is generated from the physical network, for example by information extraction/discovery. In the present system, the inventory 14 controls the physical shape and configuration of the network, not vice versa.

The master inventory stores the information required to support any operational processes, in particular those under the control of the network management system, but also external processes not discussed here, such as reporting functions.

Changes may also be made to the inventory 14 without the network planning process of steps 40 and 42 (which are supported by the network planning module 10 of FIG. 1). To enable such changes, the resource planner 12 typically includes an interactive application by way of which a network designer can add, modify or delete network resources in the inventory directly, for example to increase capacity or introduce new technologies.

Figure 3:
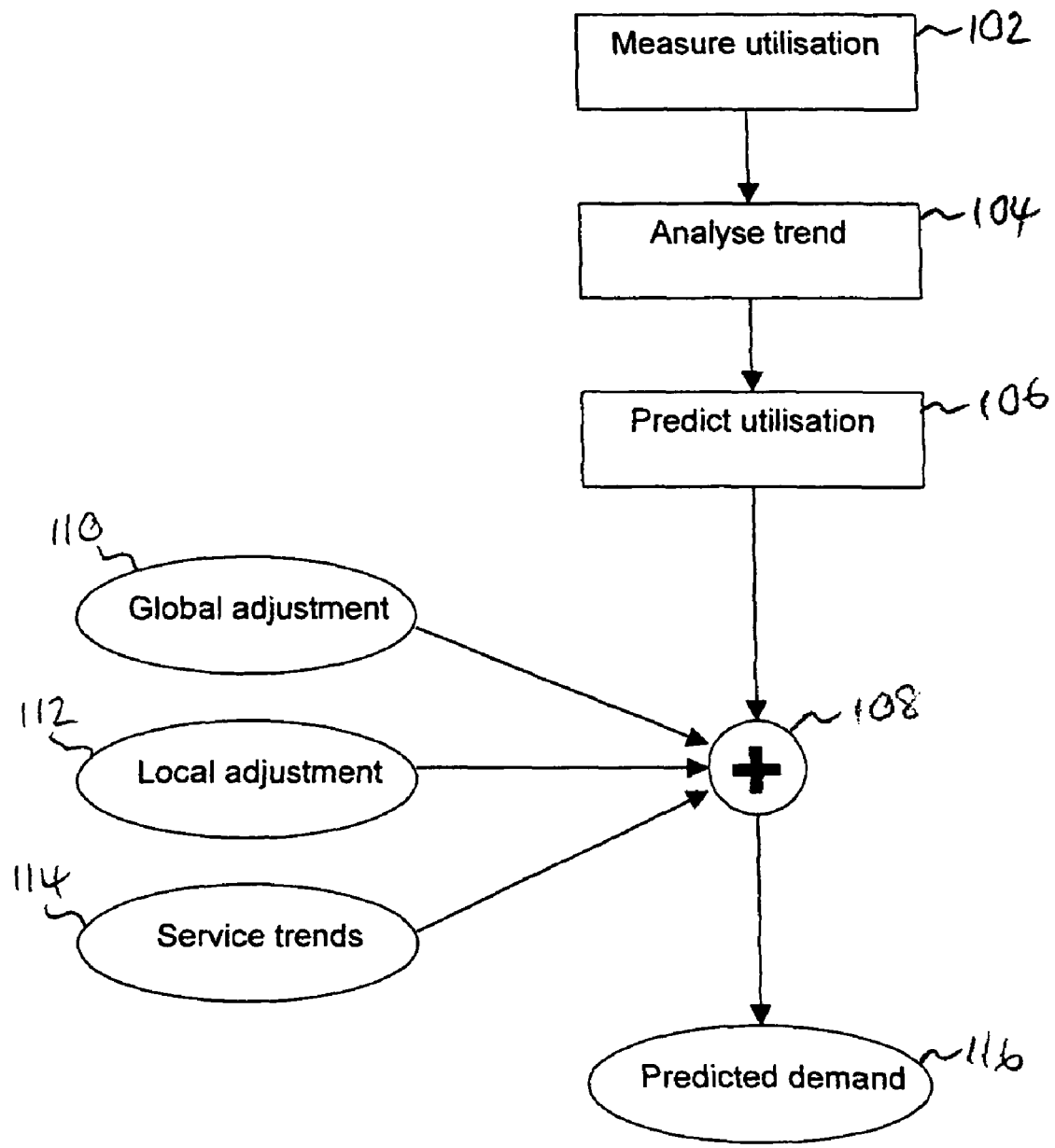
FIG. 3 illustrates a network planning method.

A variety of planning methods may be used in the network planning process summarized above in steps 40 and 42. One example of a planning method is illustrated in more detail in FIG. 3.

This planning method uses utilization information relating to specific resources to determine future demands and determine network upgrades needed to support those demands.

The utilization of a resource or group of resources is measured in step 102. This information is obtained from the service inventory and measured over time. In some embodiments, utilization data may also be directly obtained from the network.

The utilization data typically specifies the assignment of resources to services (e.g. the assignment of ports or timeslots). For example, the utilization data may specify that, at a given network location, n out of m available access ports are assigned to services, and that m-n access ports are hence available for provisioning of future services. In some embodiments, as an alternative or in addition to the above view of resource utilization based on service assignment, utilization data relating to data flow through given network resources may also be used (such data would typically be obtained from the network).

The utilization data is analyzed in step 104, and a utilization trend is determined. The utilization trend specifies whether utilization of the resource or resources is increasing or decreasing and the rate of that increase/decrease, or whether utilization is essentially static. The utilization over a given future period is then predicted at step 106 based on the identified utilization trend. Known curve-fitting/extrapolation techniques may be used to identify trends and calculate predicted utilization.

The predicted utilization of the resource or resources may be used to determine a predicted demand 116 for a given type of resource. Typically, the type of resource directly corresponds to the resource or resources under consideration. Alternatively, the resource or resources under consideration may be of a different type, but the information on their utilization may nevertheless be useful in (indirectly) predicting demand for a certain type of resource.

This predicted demand 116 can be directly derived from the predicted utilization calculated in step 106. Alternatively, the predicted demand may be arrived at by combining the predicted utilization with one or more adjustment parameters in step 108. By way of example, three types of adjustment parameter are described here: a global adjustment parameter 110, a local adjustment parameter 112, and a service trend adjustment parameter 114.

A global adjustment parameter 110 may be used to reflect conditions relevant to future demand which are generally applicable to the network as a whole, for example prevailing economic conditions or economic predictions, marketing campaigns or sales initiatives, or changes in service pricing. As a specific example, economic conditions may suggest that a period of increased growth is expected, and the global adjustment parameter may then specify that the predicted demand should accordingly be increased by a specified percentage.

A local adjustment parameter 112 may be used to reflect conditions which may affect a portion of the network, for example a specific network location, such as a network exchange. For example, knowledge of a major residential building program in a given area may indicate a likelihood of greater-than-average growth in resource utilization at a certain exchange, and a local adjustment parameter may therefore specify that the predicted demand for that exchange should be increased by a specified percentage. Alternatively, a local adjustment parameter may relate to conditions local to a given geographical area or population of an area (typically an area associated with the network resources under consideration).

A service trend adjustment parameter 114 may be used to reflect trends in the use of certain services (typically services relevant to the network resources under consideration or a network location including those resources). The service trend adjustment parameter may be determined by analyzing service information held in the service inventory to determine service trends. For example, a given network location may be associated with a greater-than-average increase in the uptake of broadband internet services. A service trend adjustment parameter may reflect this service trend by specifying that the predicted demand for a given type of network resources should be increased by a specified percentage. The service trend adjustment parameter may itself be varied in dependence on the magnitude of the service trend. Instead of services provided at a specific location, end-to-end service trends may also be analyzed (e.g. by analyzing services provided between given locations). Such service trends may affect future demand at the relevant locations or at some other location (e.g. an intermediate location which may be involved in the provision of the services), and may thus be used as the basis for service trend adjustment parameters.

The above adjustment parameters may be used in any suitable combination, and multiple adjustment parameters of any given type may be used. Typically, a local adjustment parameter will relate to a specific location or portion of the network, and will accordingly only be used in the calculation of resource demand for that location.

The adjustment parameters may be stored by the network planning module, or in the inventory 14 itself, and may be set by a network planner or obtained automatically from a suitable source. Service trends may be calculated off-line and stored (typically associated with network locations), or may be calculated on-the-fly during planning.

Once the predicted demand for a type of network resource at the given location (or, in the case of connection resources, between locations) has been determined, the network planning module 10 derives planning requirements by comparing the predicted demand for resources to the resources which are actually in place in the network and which are available for providing services (this information is available in the master inventory model 14 and/or the service inventory 22). The difference between the resource demand and the existing resources determines what resources need to be added to the network in order to meet the predicted future demand. These requirements are then used to instruct the resource planner 12 to create new resources of the relevant type in the network (e.g. at the specified location). The network planning module 10 may also instruct the resource planner to create additional resources needed to support the resources being added. For example, the addition of a certain type of device to the network may require other supporting devices to be added, and connections between devices may also need to be created. In some cases, certain network functionality required for operation of the new resources may be implemented by way of internal services (i.e. services which are not directly associated with end users), in which case the resource planner 12 interacts with the provisioning system 20 to initiate provisioning of those internal services.

Resource planner 12, which is preferably an automated process (but may include a human planner), receives the information specifying the new resources from network planning module 10 and creates the new resources in the master inventory 14.

As discussed above, in response to the changes in the inventory, change records are generated documenting the changes. These change records are then used to physically implement the changes in the network, e.g. by adding network devices and/or connections at the relevant location.

The system preferably collates multiple related change records to produce a network modification plan. Such plans typically represent groups of network changes, grouped for organizational purposes. Network construction activities are then driven by network modification plans. Changes may be grouped into plans based on appropriate criteria, such as the equipment type involved, the class of engineering personnel required to carry out the changes, and/or the network location at which the physical changes are to be implemented. Grouping network modifications in this way (especially by the latter criterion) can improve the efficiency of the network construction process.

In a preferred embodiment, the network planner 10 outputs planning data describing planned changes at a more abstract or less detailed level than is needed for implementation of the changes in the network. The resource planner 12 then determines the detailed, low-level implementation of the changes.

More specifically, in this embodiment the network planner maintains a higher-level, more abstract representation of the network, referred to as the planning model or capability plan. The capability plan models the network in terms of network capabilities (typically associated with network locations or connections between network locations), without representing the detailed network structure that provides those capabilities. In preferred embodiments, the capability plan preferably holds only such information as is needed for the planning functions.

The network planner 10 analyses resource utilization to determine future resource demands, and identifies network capabilities needed to meet those demands based on the existing capabilities modeled in the capability plan. It then outputs a planning request specifying the capabilities needed to the resource planner 12. The resource planner 12 then determines the changes to or additions of network structure and resources needed to provide the new capabilities, and implements the changes in the master inventory 14. The changes to the master inventory 14 are then translated into physical network changes as has been described above.

One preferred method of converting the high-level planning requirements output by the network planning module 10 into specific changes in the master inventory 14 uses templates, referred to herein as Standard Builds. A template or Standard Build represents a set of specific configurations, preferably expressed in the same way as data items in the master inventory and used to specify controlled changes to the master inventory.

Standard Build templates specify standard types of growth, shrinkage or change of network facilities (typically those change types which occur reasonably frequently in day-to-day operations). They can also act to constrain the planning module 10 (and/or human planners) to a given set of possible change types, which can lead to a more controlled and structured network.

Thus, a Standard Build template may specify the addition, modification or removal of resources in the master inventory. The system preferably stores a library of Standard Build templates, each associated with given planning requirements. The resource planner 12 selects a Standard Build template associated with a given planning requirement, and instantiates the template with any required parameters (for example specifying a relevant network location), to produce detailed implementation information for implementing the requirement in the master inventory.

Standard Build templates may, for example, correspond to types of capability object used in the capability plan. The addition of a given capability object to the capability plan by the planning module 10 can then be implemented by the resource planner 12 in the master inventory by using the appropriate Standard Build template corresponding to the capability object added.

As an example, a Standard Build template called 'Mid-Size SDH Customer Access' could specify an SDH Add Drop Multiplexer, at a specified location, with two connections of STM-4 bandwidth from its East and West ports to separate, unspecified core SDH Cross Connects that exist at the specified location, and presenting 400 tributary ports at 2 Mbit/s bandwidth. Such a Standard Build would be invoked if the planning module 10 determined a requirement for, say, 325 additional SDH customer access ports at a location.

To enable the resource utilization and service trends to be determined, the service inventory preferably records information allowing changes to the network over time to be analyzed. This can be achieved through data warehousing techniques such as maintaining time-stamped records corresponding to previous states of the network alongside the current network state.

In some embodiments, the master inventory 12 may store some service-related data for the purposes of determining utilization trends. This data is received from the service inventory 22 when new services are provisioned by provisioning system 20 or by way of a periodic update procedure. In this way, the network planning module 10 can determine utilization trends without needing to access both the master inventory 14 and the service inventory 22, which can lead to improved efficiency. In some further embodiments, the master inventory and service inventory may be provided as a single inventory accessed separately by resource planner 12 and provisioning system 20, thus removing the need for updating one inventory in response to changes in the other.

Example: An example implementation of the network planning module 10 will now be described in more detail with reference to FIGS. 4 to 10. In this embodiment, the planning module is referred to as the Planning Engine.

Overview: One purpose of the Planning Engine as described in this example is to drive network evolution in accordance with operational strategy. The following describes the solution architecture of this capability.

Many carriers have begun the process of migrating their traditional networks into so-called next-generation networks. Due to the major investment required to achieve such a fundamental shift in the network, it is desirable for key strategic decisions to be captured and applied in a planning process that is informed by both future demand and existing infrastructure.

It is believed that such a planning function can be best achieved as an extension to a universal inventory. This can provide a credible platform for addressing the long-term challenge of both planning rollout and ongoing strategic operation of the network. The aim is to construct an automated planning process coupling a Planning Engine with the more detailed resource planning beneath.

The Planning Engine can provide improvements in the management of network evolution, in particular with regard to the changes taking place for rollout and operation of next-generation networks. The approach described aims to achieve this through integration with the inventory, enablement of a repeatable process rather than once-only designs, the modeling of service with respect to capability as well as capacity, and an understanding of the full cross-domain problem space.

The Planning Engine forms the uppermost module in the network engineering stack, and follows the principles of a business driven network, where decisions are made in each system on data that are only as detailed as is necessary. The Planning Engine module is the master of high-level network change, and passes planning requests to the resource planning inventory for detail design and realization. The Planning Engine is enabled by the underlying network inventory data for initial abstraction load and ongoing utilization data. Tools are provided to visualize and manage the data, and to undertake high-value network analysis functions.

The following abbreviations are used in the description of the Planning Engine.

| Abbreviation | Description |
| --- | --- |
| API | Application Programmable Interface |
| ATM | Asynchronous Transfer Mode |
| CoS | Class of Service |
| COTS | Commercial off-the-shelf |
| DSLAM | Digital Subscriber Line Access Multiplexer |
| EJB | Enterprise Java Bean |
| ERP | Enterprise Resource Planning |
| FR | Frame Relay |
| GEthernet | Gigabit Ethernet |
| IP | Internet Protocol |
| MPLS | Multi-Protocol Label Switching |
| MTNM | Multi-technology Network Management |
| MTOSI | MTNM Operating System Interface |
| NMS | Network Management System |
| PWE | Pseudo-Wire Encapsulation |
| QoS | Quality of Service |
| SDH | Synchronous Digital Hierarchy |
| SONET | Synchronous Optical Networks |
| VoIP | Voice over Internet Protocol |
| VPLS | Virtual Private LAN Service |
| VPN | Virtual Private Network |
| XML | Extensible Mark-up Language |

Network Evolution Planning: Traditionally, network planning assumed stable relationships between network domains and their associated technologies. Network planning was conducted in a domain-by-domain fashion, each such domain normally a technology-specific exercise. New networking technologies were introduced as an overlay to a current technology domain.

The current network planning processes, however, typically need to cover a host of new networking technologies (e.g. VOIP, VPLS, PWE). An important issue now is how to make the transition into a next-generation network, and ongoing operation of that network. Reducing capital expenditure for telecommunication networks by using new technologies means combining the need to simplify the network (i.e. replace or at least converge legacy services such as FR and ATM by new data VPNs) and the drive to increase the range of service types. Understanding and considering the coexistence of old and new can be important. Network planning guides incremental planning to a strategic vision, allowing migration to and ongoing maintenance of a changed network structure.

The (End-to-end) Service Perspective: While telecom markets have become much more mature in terms of competition and customer focus, the services contained in each telecommunications product map less rigidly into a dedicated, associated network technology. A telecommunications product can comprise many different components. Each end-to-end service might make use of different underlying network technologies, e.g. Internet-Connectivity through IP-DSLAM vs. ATM-DSLAM in different access regions of the network, though both connected to the public Internet through an MPLS core.

Furthermore, competition is forcing convergence; various telecommunications services are being migrated onto a shared technology infrastructure. Network planning now usually needs to maintain end-to-end metrics (in particular on service quality), which are calculated across network domains and technologies.

Planning for Network Capacity and Capability: Through 'bandwidth' increasingly being considered a cheap commodity, the importance of 'capacity' as the major measure for network cost has been complemented by networking 'capabilities'. A key decision in network planning is where to put (or co-locate) different network capabilities and how to ensure connectivity with appropriate redundancy levels between them. Modern telecommunications products and their associated services each require access to a number of capabilities. The capability placement decisions, together with the capability requirements for each service, determine the traffic flows in the network. The capability placement decisions, and their associated resilience requirements, strongly impact network cost, both by themselves and through their impact on capacity demand.

The advent of next-generation networks has taken the requirements for network planning solutions far beyond their roots. The focus has shifted away from sophisticated mathematical optimization algorithms derived from graph theory, towards cross-domain network modeling and built-in support for adoptable and repeatable planning processes.

Architecture: The OSS architecture for a Tier 1 operator in the Resource Engineering and Service Fulfillment stacks can be represented as in FIG. 4.

The resource engineering planning stack comprises three components that are relevant to planning network evolution:
Planning Engine (corresponding to the network planner 10 of FIG. 1)
Resource Planning (corresponding to the resource planner 12 of FIG. 1). The resource planning component is responsible for low-level planning and implementation of changes in the inventory (and more generally, management of the inventory).
Physical Planning The Planning Engine is responsible for planning decisions for both major changes and ongoing incremental refinement, based on long-term trends, demands, strategic policy and abstracted network data from Resource Planning. The Planning Engine outputs planning requests to Resource Planning, and generally acts to automate higher level functions required by Resource Planning.

Resource Planning is responsible for converting planning requests into detailed plans. A detailed plan in Resource Planning is actualized by passing physical planning requests to Physical Planning and logical requests to the fulfillment stack. Resource Planning is synchronized with Physical Planning and the fulfillment domain managers and inter-domain manager. Resource Planning will update network planning changes in these domain managers. The Planning Engine extracts and abstracts Resource Planning data to support its function.

Physical Planning is responsible for the physical layout and cabling of the network infrastructure, including power, cooling and space requirements for both outside plant and within buildings.

Figure 4:
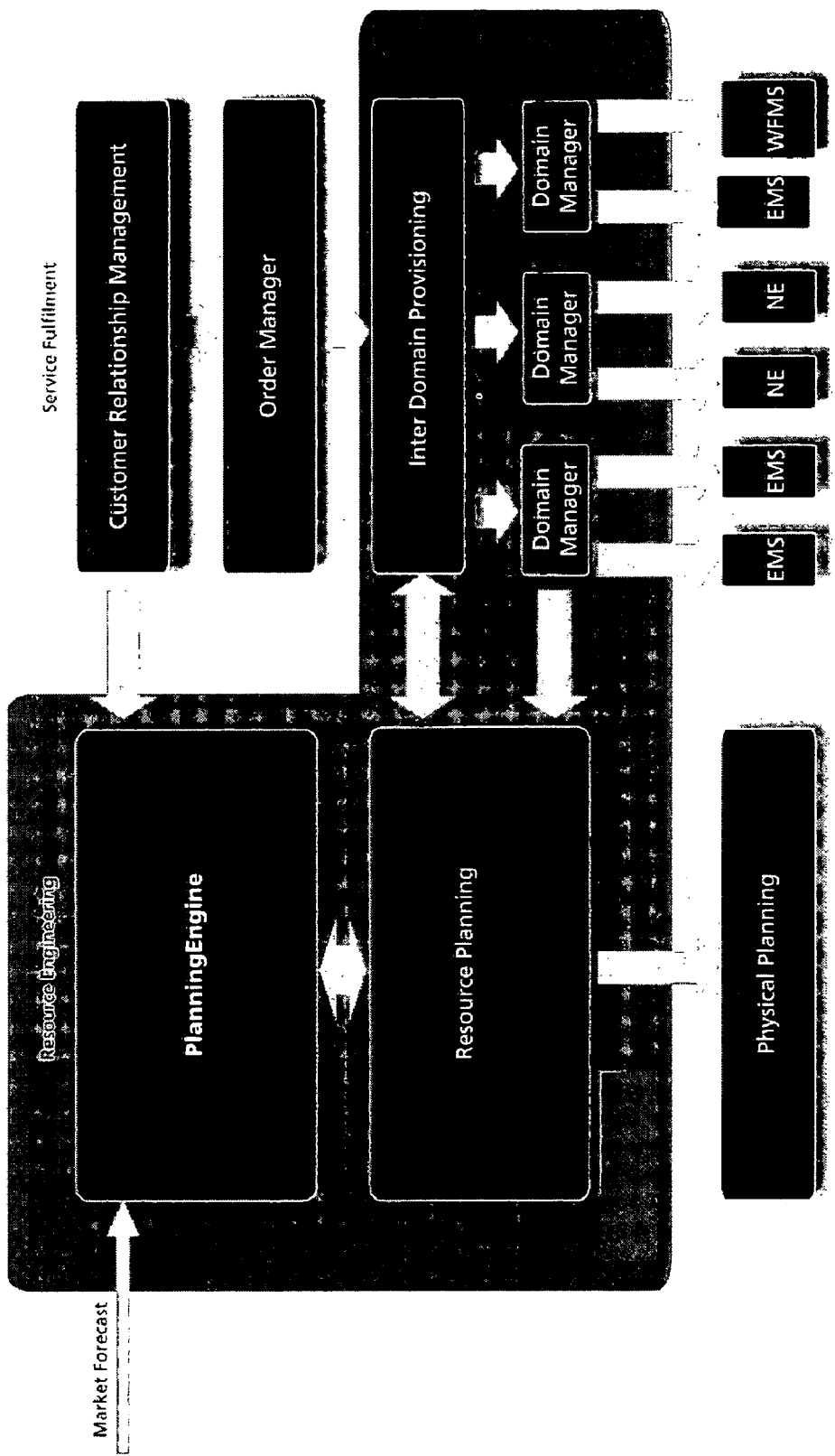
FIG. 4 illustrates a Tier 1 Systems Architecture

The present example is concerned primarily with the Planning Engine, within the context set out in FIG. 4. The Planning Engine is designed to facilitate ongoing network evolution and refinement by directing day-to-day growth, in accordance with a strategic intent, using inventory data as a key enabler. This is based on market forecasts and an understanding of the planned network structure and topology and its utilization trends.

General capability: The Planning Engine is cross-domain and multi-technology. A network may be conceptually split into domains, such as access, backhaul and core. The, Planning Engine can enable this split to be defined and adhered to. The network will also typically comprise a multiplicity of layered and intersecting technology topologies. The Planning Engine capability can enable the management of the evolution of these network layers.

Planned extensions to the network are made in the Planning Engine and passed down as planning requests to the Resource Planning platform for detailed design. The network can then be proactively managed according to operational policies. Network utilization data is fed back to planning to complete a closed loop of network evolution.

It is this access to inventory data and coupled process that empowers the Planning Engine process. The Planning Engine can also interact with marketing systems to receive market forecasting data and feedback actual utilization, and with ERP to set budgetary requirements and enable decisions on expenditure.

The Planning Engine can manage networks on a green-field or brown-field basis, and the ongoing evolution of those networks.

Planning Engine Process: Objects are planned in the Planning Engine at abstract level, for example introduction of locations, or circuits between locations. These abstract objects are managed according to the map stored in the Capability Plan. The Planning Engine is master of these abstract objects for capacity/capability affecting changes, and their introduction to/removal from the network. The utilization of these objects is synchronized with an underlying inventory and held on each object.

Figure 5:
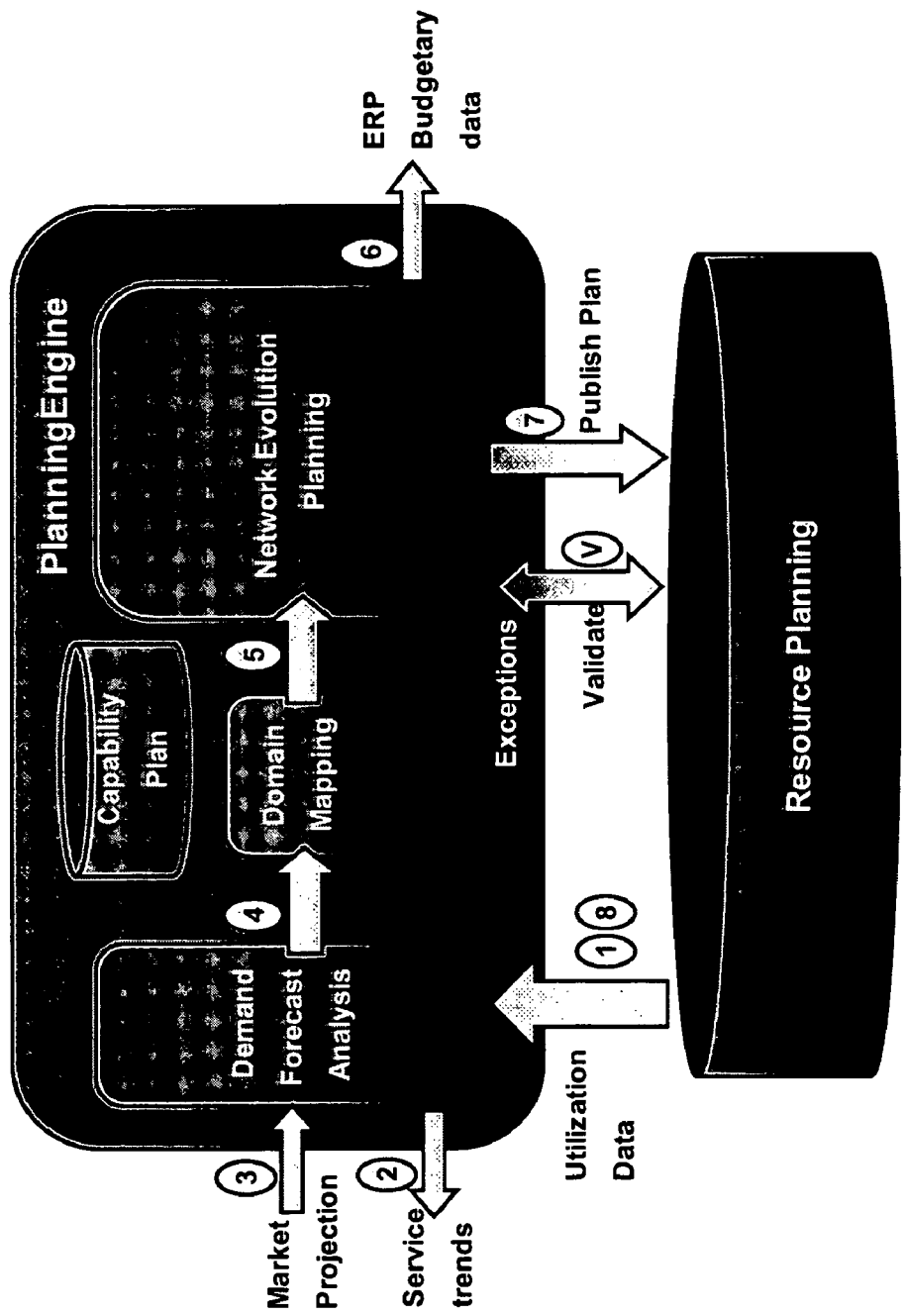
FIG. 5 illustrates a high-level planning process.

The planning cycle is illustrated in simple terms in FIG. 5.

Initially, utilization data is populated in the Planning Engine from Resource Planning (1). The utilization data on an object records utilization over time. The utilization information is updated by marketing forecasts (3), and is used to drive network demand inputs. Marketing forecasts are improved by feeding back service utilization trending data (2).

The service demands are then mapped onto underlying domains using a map of location-based capability—the Capability Plan (4).

The network evolution is then planned (5), for each domain and its capacity requirements. The planning system can be validated against the underlying inventory data, and exceptions raised to the user.

The deltas (i.e. differences) to the abstract network are captured as planning requests. A manual checkpoint and dialogue to ERP systems (6) for budgetary level validation may follow, before the request is passed down to the Resource Planning system for detailed design (7).

The loop with Resource Planning is closed when the utilization data is passed back to Planning Engine (8). A synchronization capability is provided between Planning Engine and underlying Resource Planning to flag any exceptions to this process (V).

Initial dataload of the Planning Engine is possible from the Resource Planning system over the same interface, or manually within the Planning Engine.

Use of the Planning Engine: The Planning Engine can facilitate the planning of the future evolution of the network taking input from current network utilization and capacity usage, the projected future network demand and the operator's forward looking technology strategy. The key objective is to facilitate ongoing network capacity and capability management, e.g. adjusting the network to make sure that enough capacity will be available to accommodate the forecasted demand and expected network load.

Typical use cases include:

Network extension

Network capacity and capability expansion in response to projected future traffic growth, evaluation of alternative network structure and architecture evolution options.

Network consolidation

Consolidation of the network based on re-routing optimization aimed at optimizing network utilization, consolidating fragmented service routing and improving network performance.

Network migration

Support for the introduction of new technologies

The Planning Engine applies across all network domains with the objective of determining required changes to the current structure and what additional capacity and capability within the individual domains will be needed in order to support the projected demands. In general, the main use case is the non-greenfield situation, since an existing network (with already installed and partially used network resources) typically needs to be taken into account.

The usage of the Planning Engine is characterized by the following fundamental guidelines:

Network planning is performed against an abstract network model: Network evolution planning is typically carried out on an abstracted view of the network represented in the logical network inventory (e.g. master inventory 14). Abstraction is mainly driven by data aggregation (e.g. bulk object model, collapse) and simplifications. The level of abstraction may vary and depends on the type of use case and application scenario (for example: bulk capacity estimation vs. fine-grained capacity adjustment).

Network planning is organized according to planning domains: In general, the planning process is organized in a step-by-step fashion and performed against distinct planning domains. These planning domains represent an appropriate partitioning of the overall network, which reflects the different network segments involved in delivering a certain type of service. Each planning domain is characterized by a certain technology (for example ATM, GEthernet, MPLS).

A typical planning domain topology is characterized by a partitioning of the network into a converged packet core and geographically separated backhaul aggregation domains with gateway and service enabling functions at metro nodes.

Figure 6:
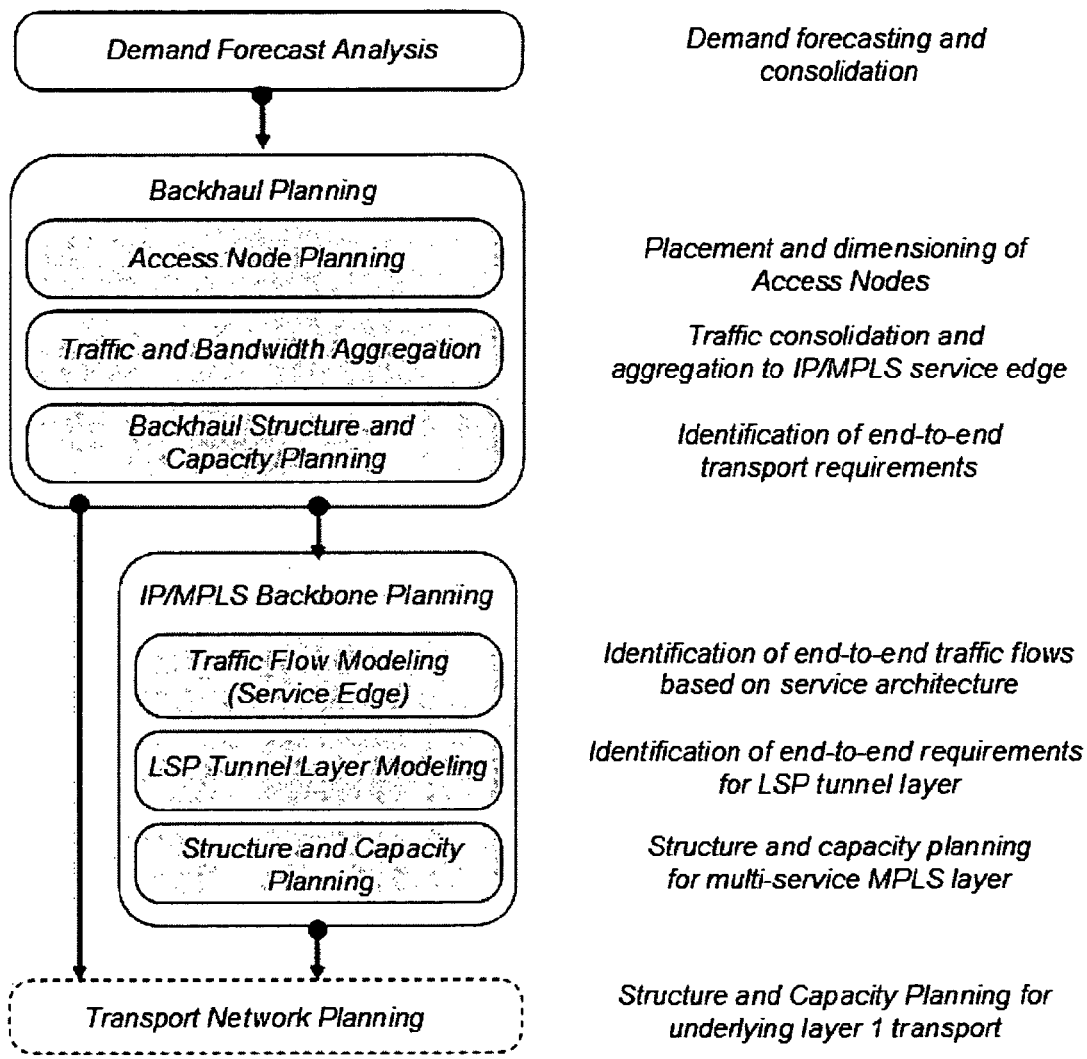
FIG. 6 illustrates an example of a typical planning process (high-level)

FIG. 6 illustrates a typical network planning scenario focused on network capacity extension and indicates potential design steps. In this example the backhaul aggregation segment might be based on ATM technology facilitated by an underlying SDH/SONET transport infrastructure while the packet core network is based on IP/MPLS.

An architectural principle of the solution is to provide a flexible, configurable framework for the Planning Engine. This framework is preferably extensible and comprehensive.

The example is based on a number of assumptions:

For the sake of cross-domain coverage, the Planning Engine operates on a more abstract representation of the network than the inventory does (e.g. by aggregation of circuits into bundles and neglecting time slot assignment)

Planning requirements cover both abstract capabilities for automation and strategic decision-making, and for detailed network design.

Planning results in terms of new equipment build are expressed in terms of (frequently used) building blocks for network elements (so-called standard builds). Detailed configuration choices should preferably be made in detailed resource planning, but could also be incorporated into the Planning Engine.

The traditional focus of network planning is strategic. It was undertaken occasionally, with target network design driven by mathematical optimization (primarily operating on a minimum cost metric). The approach proposed herein considers network planning as a continuous process. It frees the user from the majority of repeated planning tasks. It improves the significance of the results by starting from a more recent view of the network (from the inventory).

Differentiators: This section describes aspects where the present approach for planning is different from existing approaches.

Planning Integrated with Inventory: Traditionally, network planning is performed offline. The gap in functionality and data between the NMS and the planning applications is too wide for simple upload interfaces. Mediation to the various NMSs and an additional consolidation function are too expensive.

Additionally, driving an offline planning system from out of date snapshots of the network increases the risk of failure.

The present solution for planning uses the inventory functions (in particular the master inventory 14 as shown in FIG. 1), to keep the data accurate and enabling an effective network engineering process.

From Once-only Design to Repeatable Processes: Traditionally, network planning is performed on a network-snapshot, with optimization determining near-simultaneous, one-off, local optimizations in order to achieve an approximate global cost minimum for the network captured in the snapshot. The lifecycle of planning consisted of a sequence of usually un-correlated snapshots.

The present solution can support a repeatable planning process, both in a periodic and perpetual manner. In particular, planning decisions can be stored, re-used in repetition runs and can be open for re-evaluation.

Each planning proposal typically requires many atomic decisions, each of which is usually a selection of a very limited number of options (e.g. should there be a direct link on layer x between location A and B?).

The present solution builds an audit trail of decisions, and allows rollback of these decisions and capture of processes as templates.

In that respect, the Planning Engine preferably also stores a repository of planning decisions, whose re-use is enabled via process templates.

Capability in Complement to Capacity: Traditionally, network planning focuses on network capacity, i.e. the objective is to determine the necessary capacity within and between locations, on a per domain basis. The objective of planning was to determine a (cost-) minimized network i.e. an appropriate network topology and associated capacities (on a per layer basis). 'Cost of capacity' was the driving force.

The present solution for planning preferably combines network 'capabilities' (such as voice call features in the call servers) with network capacity and QoS-related network metrics. This implies a cost model which can contain cost items that are not capacity-related at all.

From Domain-specific to Cross-domain Optimization: Traditionally, network planning follows a sequential process, optimizing the overall network in a sequential layer-by-layer process.

From a pure capacity perspective, this de-composition approach can work. However, as a single end-to-end service now travels across various stacks of network technology, the present approach preferably supports:
- a cross-domain cost model allowing comparison of different solutions
- end-to-end and cross-domain resilience analysis function Optimizing networks in a cross-domain sense can be a complex task. A two-step approach can help:
- a cross-domain metric (in terms of both end-to-end cost and end-to-end QoS/resilience quantifiers) can be used; such a metric can allow for comparing different options and provide a framework for 'simple', rule-based planning procedures
- on top of the cross-domain metric, 'true' cross-domain optimization procedures could be built, which attempt to propose the appropriate distribution of network capabilities and capacities across network domains Many COTS products for planning are dedicated to a subset of network types e.g. mobile wireless or fixed wireline. Consolidation of historically grown networks onto converged platforms will typically result in a mix-and-match of network technology stacks.

The present solution for planning is preferably configurable in terms of the network technology stack it can support.

Solution Architecture: The proposed Planning Engine solution comprises a set of interacting solution components. Each of these components accesses data in a common repository and provides a consistent interface through APIs, the Process Engine and through the GUI. The solution components are illustrated in FIG. 7.

Figure 7:
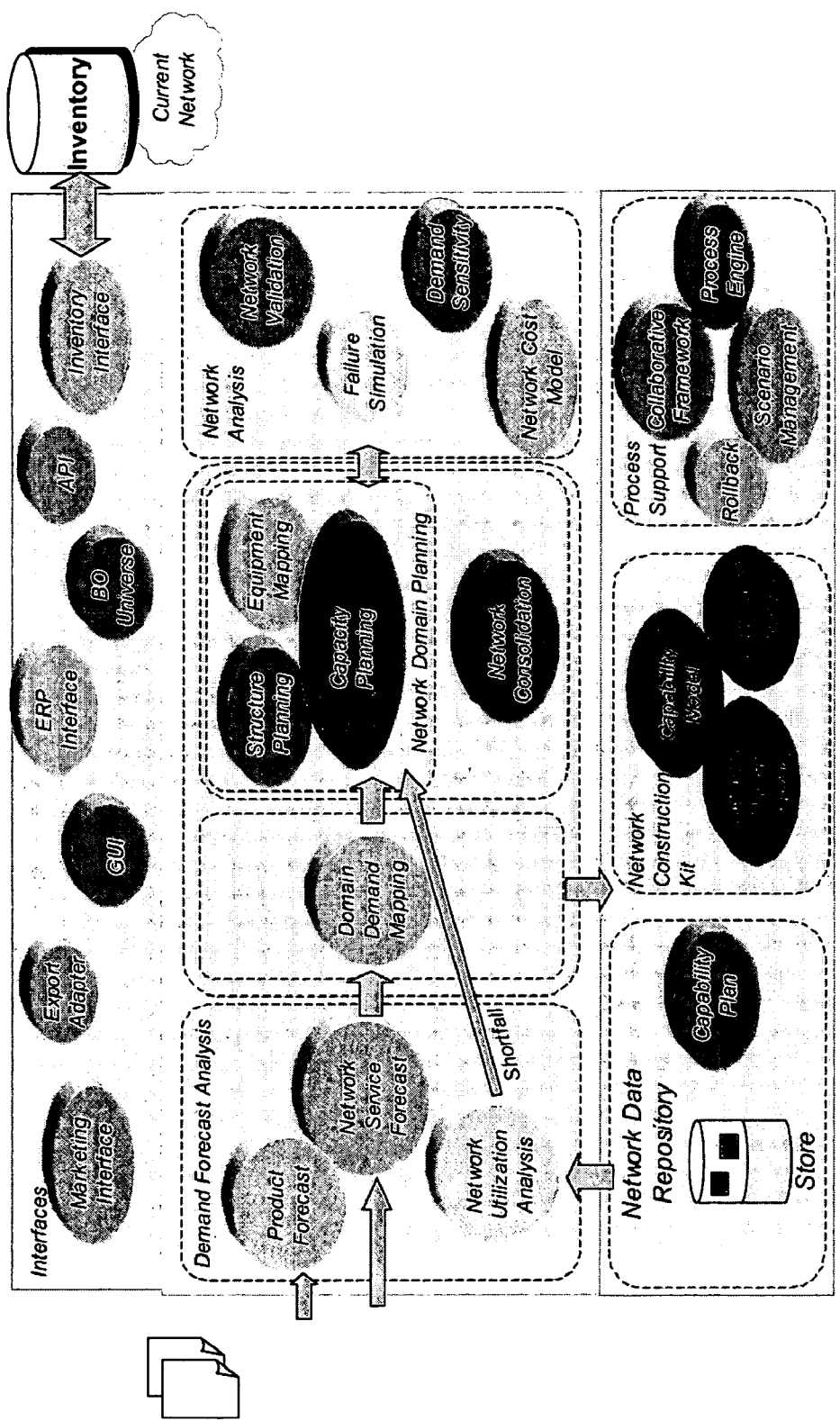
FIG. 7 illustrates solution components of an example implementation of a network planning module.

The solution architecture is conceptually split into three tiers as shown in FIG. 7. There is a data tier, an application tier and an interfacing tier. Within these tiers, there are a number of major blocks and sub-components. These are listed below:
- Demand Forecast Analysis—this comprises demand forecasts due to Network utilization and Market forecasting, and the amalgamation of these demands into a common framework of service demand matrices in Network service forecast.
- Domain Demand Mapping—this maps the service demand onto each domain.
- Network Domain Planning—Equipment Mapping resolves the demand on a domain onto the supporting network resources, without the need for the detailed equipment models found in Resource Planning. Management of the topology of the network is undertaken in Structure planning. Comparison with current utilization data in the data repository leads to delta capacity plans, managed in Capacity planning.
- Network Data Repository—comprises the data supporting planning. The Data Store comprises the network data on which planning takes place at the level of abstraction required for planning purposes. The Capability Plan describes the strategic intent in terms of location and technology capability and domains. It provides a simple yet comprehensive way of modeling, at a summary level, a large-scale telecommunications network. This allows the strategic network planners to decide the strategic intent of the network and its exploitation policy at the outset of network design. It then directs the ongoing plan of the network to be constructed in accordance with these rules. These rules are derived from a common network strategy, which also determines how the network is utilized. They are captured as data and are applied either as network is constructed automatically or manually.

Historically, it has not been possible to adopt a bottom-up approach to summarizing network models based upon ITU-T G.805 and TMF 513/608/814. This bottom-up approach has struggled because of a lack of abstraction, so attempts have tended to focus on solutions that preserve the greatest amount of information.

The Capability Plan uses a top-down approach, taking into account the operational (or business) and technical requirements, which are validated as supporting the needs of the network resource operator and Service Provisioning architecture. The absence of detail in the model means that it does not need to be permanently synchronized with the Resource Planning system, providing a level of decoupling that benefits the overall architecture.
- Network Construction kit—this describes the rules by which the data in the store is constructed, and is composed of three sub-component libraries: Domain library, Equipment library and Capability Model.
- Process Support—comprises Scenario Management which describes the rules by which planned scenarios are managed within a time-line, Collaborative framework which manages user access and responsibility, Planning Records and Rollback which captures changes and enables rollback, and Process Engine which can be used to capture processes with automatic and manual intervention.
- Network Analysis—comprises Network Validation which provides the capability to analyze network designs with respect to their compliance to the intended planning rules, Failure Simulation which provides the capability to analyze and verify the current network or a proposed network design for the extent of network failures, Demand Sensitivity which provides a sensitivity analysis of network forecasts based on variations in service forecasts from marketing or network utilization, and Network Cost Model which provides a framework for describing a network and its sub-items in terms of 'cost'. The network cost model allows for assigning cost to both capacity and capability related network items. It supports cost items of both capital and operational expenditure. It thus can deliver expenditure data for profit/loss related calculations as men as for cash flow/investment related calculations.

The cost model delivers both
- individual cost figures, i.e. a list of all cost items associated with a single network object and
- aggregate cost figures, i.e. it sums up cost of certain categories Call capital expenditure for equipment of type Edge, Metro and Core)

In addition, it works as a server to fill cost attribute values for all sorts of algorithms (routing, topology optimization).

Cost information is generally owned across systems, at differing levels of granularity and for differing purposes. The cost model used internally for making planning decisions is based on real world costs assigned to equipment and capacity. Asset management systems or ERP systems can manage such costs, which implies that the Planning Engine can preferably liaise with these systems to build and maintain its cost model. Cost information maintenance may be manual.

Interfaces—comprises GUI which defines a user interface to facilitate user interaction, API which defines a comprehensive application programmable interface for undertaking all planning activities, a Marketing interface that supports reports on actual service utilization trends to aid marketing forecasts, an ERP interface that supports the publishing of proposed plans for budgetary approval, a Business Object Universe for extra reporting requirements, an Export Adapter to allow scheduled, scoped export of data to external systems and Inventory Interface which defines an interface to enable the utilization of inventory data and a coupled process between planning and inventory. This two-way interface comprises extraction from the inventory for data population and validation, and a publish plan capability to the inventory.

The above sets out the structure of the Planning Engine in overview in terms of constituent components and their functions. Some aspects of the Capability Plan component and interface components will now be described in more detail.

Capability Plan: The removal of capacity management responsibility from the Capability Plan can help to create a summary model of the network. Without capacity to consider, detailed logical and physical information can be omitted.

The Network Capability Plan can be modeled using six basic objects:
  Network Domains
  Area Locations
  Physical Capabilities
  Site Locations
  Technology Capabilities
  Logical Capabilities Each object type can be sub-typed so that a particular Capability Plan can be adapted to address specific technologies or provide an appropriate level of granularity. This is achieved in the Capability Model. For example, specialist Technology Capabilities (and Logical Capabilities) are normally created for MPLS, Ethernet, and so on. However, it is possible to go further and create network roles, such as backbone and access within the Technology Capabilities if required.

Figure 8:
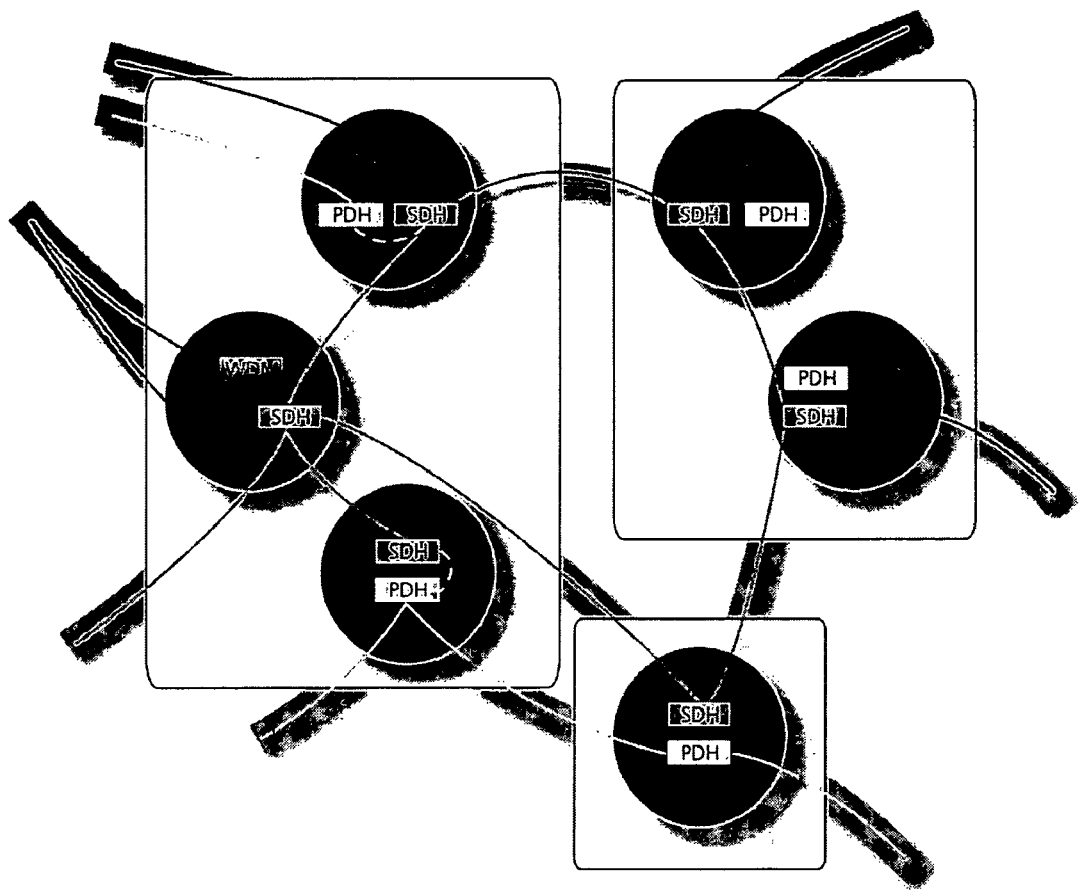
FIG. 8 illustrates an example of a Network Capability Plan.
Figure 9:
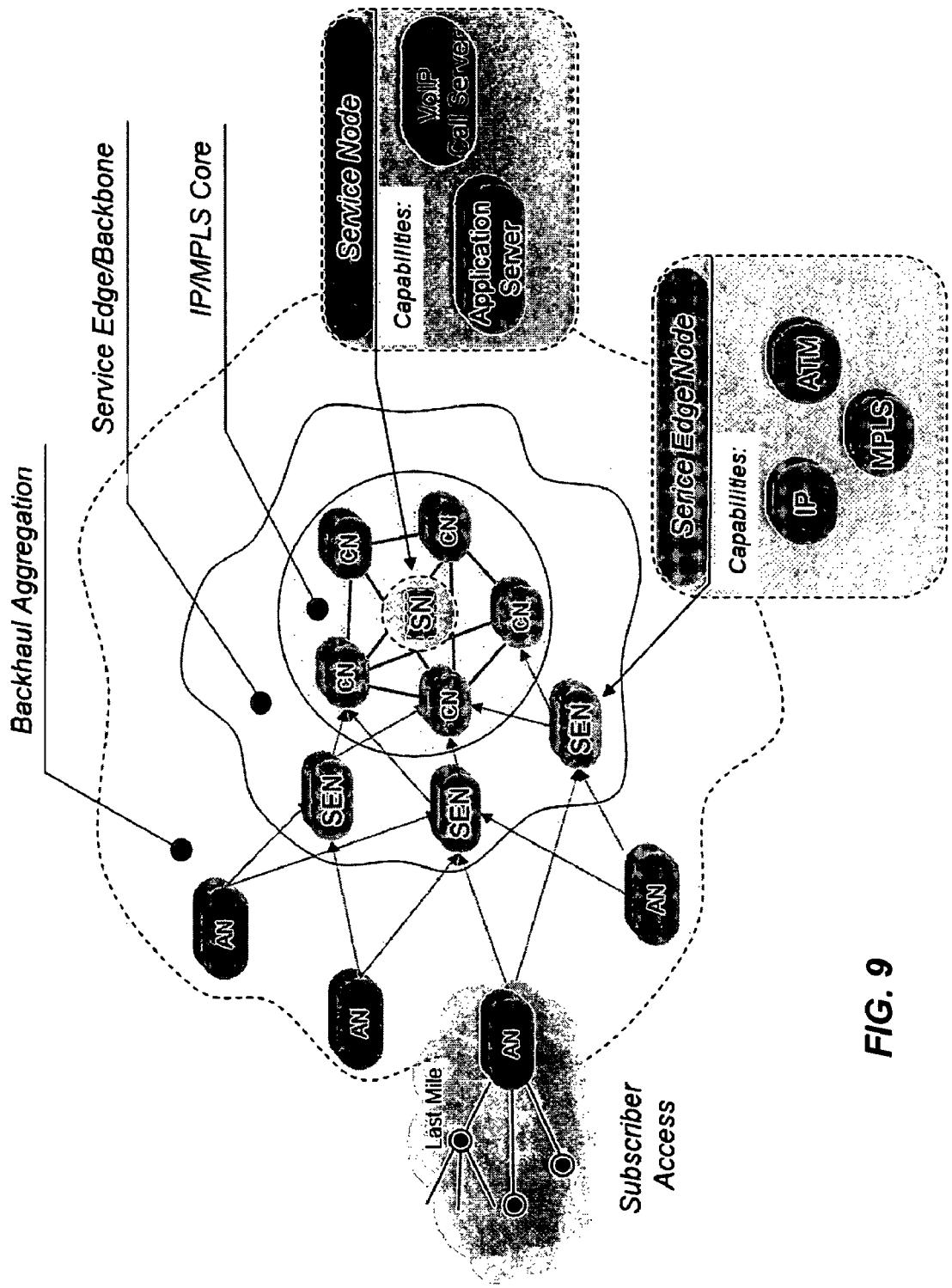
FIG. 9 illustrates partitioning a network into domains and classifying nodes.

FIG. 8 shows schematically how they might be related in a particular implementation of a Capability Plan. The following sections define the function of each element in the Capability Plan. Network Domain: Planning Domains group together locations of like purpose. These represent a flexible method of splitting the network into functional blocks. For example, Access domain, backhaul domain and core domain are useful splits of a next-generation network (an example of this is illustrated in FIG. 9).

The domain is then used as a method of dynamically classifying locations.

Area Location: This represents an administrative arrangement of other Area Locations and Site Locations. An important concept associated with an Area Location is that all Logical Capabilities (see below) that exist at Site Locations within Area Locations can be connected without recourse to outside agencies. This delegation of responsibility to local field engineering enables the Capability Plan to summarize its model further because local physical connectivity between technical domains can be omitted from the model.

Therefore, an Area Location has a single operational owner from a physical planning perspective. Area Locations may be hierarchical so that complex physical and organizational structures can be represented.

Site Location: A Site Location is a place where equipment can be located. However, as no actual equipment is referenced in the Capability Plan, this concept has some flexibility. It may be a central (CO), a point of presence (POP) or a customer location. A site location usually represents an equipment room, not necessarily a site.

Interconnections within a location can be assumed or can be explicitly captured between abstract devices. Non-connectable connectable floors can be captured by explicitly excluding such interconnections.

A Site Location may contain a number of Technology Capabilities.

Physical Capabilities: This represents the high level or strategic view of the location. It includes the routes between Area Locations, which is a technology independent indication of the potential physical connectability of Area Locations. It is similar in concept to strategic cables or ducts.

It also includes an aggregated record of the space, power and cooling that is present at the location and is available for use by new network facilities. This gives the planner a good indication of what capability can be deployed at a location and the extent it can be used for strategic growth.

Technology Capability: This is an abstracted view of technology that is present or that is strategically available at a Site Location, and represents the capability of the network.

Note: The presence of a Technology Capability does not imply the presence of equipment or capacity. It implies that the location can be used to site equipment with a particular capability.

Logical Capability: Technology Capabilities are connected by Logical Capabilities. They are logical pathways in the network. They represent the aggregate of all connections that join things together and record the total capacity provided by the aggregated Technology Capabilities and the capacity available for new service.

In overview, the Capability Plan can provide the following functions & capabilities:
  Provide an abstract framework for the global optimization of network planning decisions.
    Identifying placement of node/locations and their role within the network architecture
    Identify capabilities available at each node/location ('capability map')
    Identify the high-level network architecture and structure in terms of partitioning the network into geographic areas (domains, sub-networks), for example Access area, Backhaul aggregation area and IP/MPLS backbone area
  Apply the network exploitation policy decided upon during strategic network design when planning network evolution.
  Enable existing network configurations to influence future network build decisions in order to minimize operational and capital expenditure.
  Minimize the data and processing overhead required to maintain the model.

Capability Model: The Capability Model comprises the rules by which the Capability Plan is constructed.

These rules are captured as metadata and are applied as the Capability Plan is constructed automatically or manually. For example, location types can be defined in metadata, with the associated allowed capability types. The Capability Plan will then construct data instances of locations of a given type, with capabilities as permitted.

The effect of these metadata restrictions may be configurable. For example, certain rules may be mandatory, others are recommendations with warning levels. This will allow the user to knowingly build local instances that do not follow the intent of the capability plan. The Network Validation component provides functionality to report on deviations from the capability model.

The rules can be grouped into the following types, which define the policy decisions to be captured:
  Domain classifications—Define the available domain types, such as Access, Backhaul, Core.
  Site classifications—Define functional classes for locations such as Access Node, Metro, Core, Service
  Technology classifications—Functional classes for devices and circuits based on the supported technology.
  Data restrictions based on data type, domain, site and technology classification—For example, device types, standard builds, circuit types can then be associated with these classifications. e.g. a MarconiSmallMetro location type is a Metro class site. MPLS circuits can only terminate on MPLS devices (technology classification) at Core or Metro sites (site classification).
  Connection cardinality between sites—based on the site classes and connection types (e.g. Metro sites are dual-homed to Core sites).
  Connection ordinality of sites—determining the containment hierarchy, e.g. Metro Node site also implies an Access Node capability.
  Service type/Domain mapping—allowed service types for a domain Some details of the interface components are set out below.
GUI: The Planning function preferably provides a complete GUI implementation to facilitate user interaction. Users can preferably browse data, manage planning objects, report on plans and planned network and manage the planning cycle. Low and high level planning functions are supported in a controlled manner via wizards.

Each solution component is preferably delivered by using a coherent set of one or more GUI Tools, e.g. wizards to create data items and interactive, navigable reports on the data. The specific types of tools will vary for each solution component.
  The following functions and capabilities are preferably provided by the Planning Engine GUI.
  Look and Feel should preferably be suitable for use by planning operatives who are not necessarily computer experts.
  Architecture
    The architecture allows flexible creation and manipulation of the user interface
    A full Web client is preferably provided, compatible with Microsoft Internet Explorer (TM) or other available web browsers
  Integration
    Flexible full web access is preferably available to all applications Export Adapter: A packaged capability may be provided to allow export of data from the Planning Engine.

The scope of data is preferably configurable, and the export preferably has a scheduler for initiation.

API: A comprehensive API is preferably provided for undertaking all planning activities. The wizards within the Planning application also make use of these APIs. These APIs exist at each logical layer of the application, providing flexibility in terms of automation (lower level API calls) and integration (coarse-grain service-based interfaces).

The API preferably includes the following functions and capabilities:
  Low level API for writing to data tables.
  Higher level EJBs for methods on the data
  Web Services for external interfaces
  XML-based coarse grain interfaces
  Maintains a log of API calls
  Maintains a log of exceptions Inventory Interface: One feature of the proposed Planning Engine is the ability to utilize inventory data and provide a coupled process between planning and inventory.

The interface between planning and inventory is a two-way interface with three modes of interaction:
  Data population: Planning retrieves data from the inventory to populate its data repository with initial data and thenceforth with ongoing utilization data
  Data validation: Planning retrieves data from the inventory to validate the state of its repository (especially before issuing a planning request)
  Publish Planning Request: Planning initiates requests, updates and cancellations of planned network alteration These three modes may be further classified as an Import/Validate Strand, and a Planning Request Strand.

Figure 10:
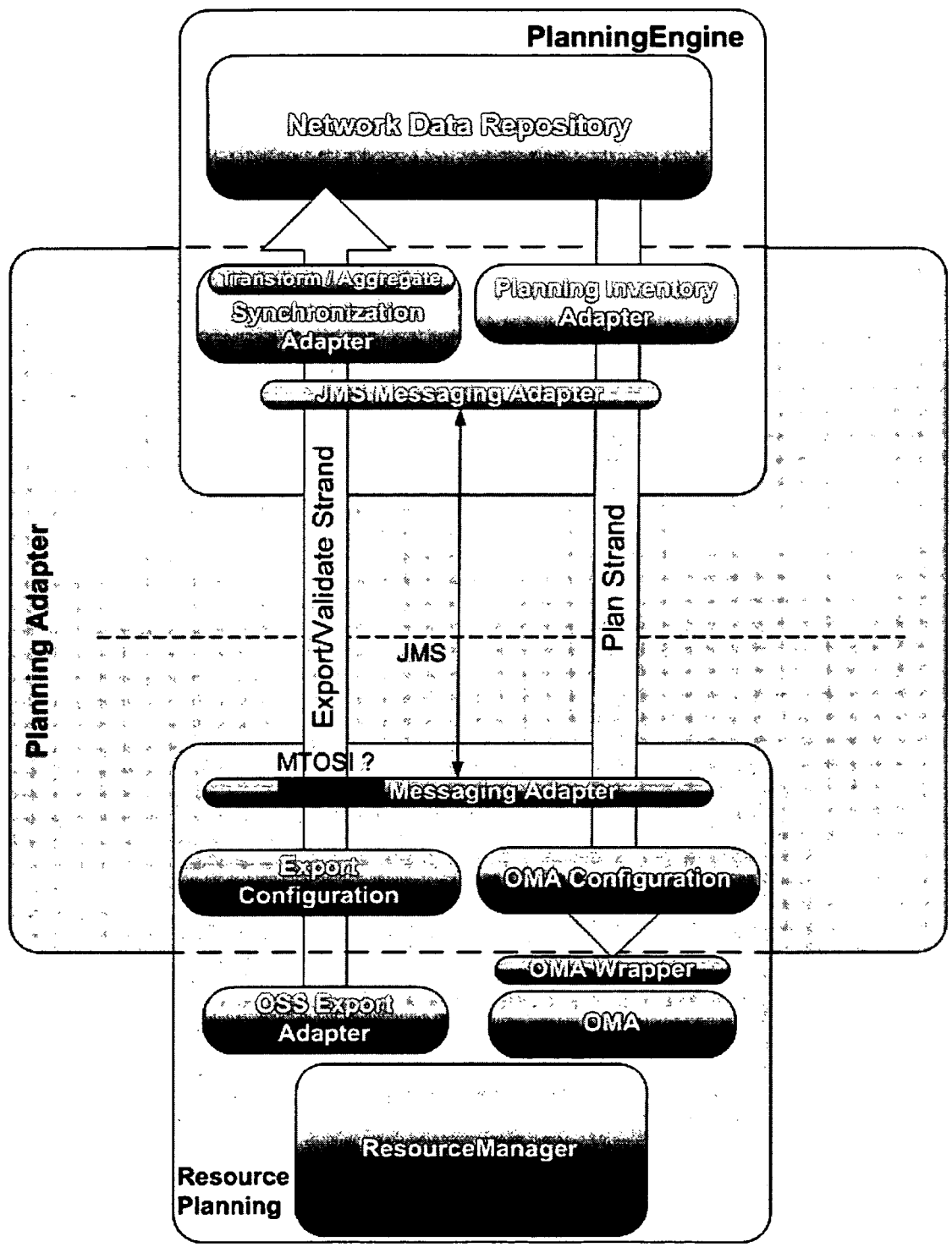
FIG. 10 illustrates the planning/inventory interface.

This is shown in FIG. 10, which illustrates the planning/inventory interface.

The Export/Validate strand is initiated in the Planning Engine to retrieve data from the inventory. This may be either for an initial (or new) load of data, or for a targeted validation of a portion of network on which a scenario has been constructed. This data extraction is preferably MTOSI compliant.

The data is abstracted using transformation and aggregation. This abstraction is as specified below:
Sites/Devices:
  Port data is aggregated by type
  Device structure is not passed at all
Circuits:
  Circuit timeslots and timeslot mappings are not held
  Circuits may be aggregated into n.times.bandwidth connections between locations, or individual connections between locations.
  No customer circuits are passed over the interface, just utilization.

Planning may require common terms of reference for the data passed over the interface. This is achieved by a mapping between the systems that is not necessarily 1-to-1 due to the data abstraction.

The Plan strand is to initiate new build requests, updates and cancellations from Planning, and accept Plan status updates from Design. These requests take the form of requests for:
  Site capacity (number of terminations by type, standard build)
  Link capacity A to Z (technology, CoS, protection), with underlying node-to-node routing
  Topology structures (device/circuit mesh)

Some functions and capabilities of the Inventory Interface component are set out below (these may be provided independently or in any combination):
  Import/Validate Strand
Data Retrieval
The inventory provides an export capability of data to Planning, on demand. The exports will be either a complete record of the relevant data objects, or the 'deltas' since a defined time. The delta export is a record of those objects to have changed since a specified date. Create deltas and Update deltas are defined as those objects to have changed since the specified time (i.e. not a record of the change, but a record of the object following the change). Delete deltas are a set of deletion actions (or state changes to 'pending delete'), with associated object ID.

Exports are scoped according to:
   Object type (sites, circuits, topologies).
   Modified flag (for delta exports)
   Object status (e.g. do not include 'Planned' objects, do include 'Pending' or 'In Service').

The data export is preferably configurable and flexible.

The data export preferably accepts scoped requests for data. The data request is initiated from Planning, and may be scoped down to a subset of data (to support the validation for a specific scenario).

The data export preferably adheres to the MTOSI standard.

The data from the inventory source is aggregated into abstracted forms for planning, i.e. aggregation transforms are applied.

The import into planning populates the data repository with a new data version.

Errors during load are captured and displayed

The load process supports an abort, should the errors be considered too serious

Planning supports validation checks of the new data, once the load data is successfully stored in the data repository. Validation includes referential integrity checks, attribute checks and simple network connectivity checks.

The existing plan scenarios may be migrated onto the new data view

The Planning system supports the deletion of the old data version, once obsolete.

Plan Strand
Planning Request
The Planning Engine supports the construction and passing of a Planning Request to the inventory/Resource Planner, manually initiated or via API.
A Planning request supports the following types:
   Build Site: a description of a site requirement (standard build type, number of ports of type)
   Build Capacity: a description of a (circuit) capacity requirement, CoS, Protection, and the underlying abstract routing through the network
   Build topology
Resource Planning handles Planning Requests. On receipt of the build plan message, the underlying Resource Planning will generate an Order object corresponding to the plan. In addition to the order object, a project will be created per top level element (n.times.Location, or n.times.Circuit). A default project type is preferably supplied for each of these:
   Build Plan—Location
   Build Plan—Capacity
   Build Plan—Topology
   Reroute:—circuit ids
Planning Request Update
The Planning Engine supports the construction and passing of a Planning Request update to the inventory, manually initiated or via API.
A Planning request update supports the same types as a Planning Request
A textual 'Reason' may be sent with the update
Cancel and submitting a new Plan may be used for any substantive update
Planning Request Cancellation
The Planning Engine supports the cancellation of a Planning Request (manually initiated or via API), and sending a cancellation to the inventory.
A textual 'Reason' may be sent with the cancellation
Plan Status Update Event
   The Inventory may be configured to support a status update message of 'Abandoned' or 'Completed'
   The Planning system supports the receipt of the Status Update Event and logs it on the Plan.
The above functions may use the following data items:
   Site: a description of a site requirement (standard build type, number of ports of type)
   Circuit: a description of a (circuit) capacity requirement, COS, Protection, and the underlying abstract routing through the network
   Topology
   ERP Interface: Plans for network enhancements or changes can have significant impact on Network Engineering budgets within a telecommunications service provider/network operator. Planning decisions are therefore preferably visible to ERP systems. Furthermore, many network operators have a checkpoint in ERP with a go/no-go decision point for any major plans.

The level of detail held in the Planning Engine is typically insufficient to supply a full bill of materials to ERP. For this level of detail, Resource Planning may be a better source of data. The Planning Engine preferably does hold high level costing data, and can approximate the timing and cost of adding new capability at a location. This can typically be useful for setting budgets for the year ahead etc., rather than for proceeding with a specific equipment order.

To support these business functions, the Planning Engine preferably supplies plan data for new build, and at least supplies a holding state for plans in the Planning engine, awaiting a go/no-go decision. Optionally, this interface can be automated.

The following data items may be used by this component:
   Approximate equipment costings based on location/node/port costs.
   Pending state for Plans
   Marketing Interface: An external Marketing function may supply market demographic data, or product and network service forecast data into the Planning Engine's Demand Forecast Analysis components.

As marketing forecasts are often distrusted within the telecommunications community, the Planning Engine can also supply data on Service Utilization trending back to Marketing. This information can provide an effective feedback mechanism which can enable forecasting to be improved.

The interface for Marketing data import into the Planning Engine is via file import. The file format is XML, according to a predefined schema.

The interface from the Planning Engine to Marketing may be a report of Service Utilization trending, made available to the external system.

Some functions and capabilities of this component are set out below:
   The Planning Engine supports the publishing of Service Utilization Trending data to marketing
      The data is preferably formatted and human readable, as a report
   The Planning Engine preferably supports at least file-based import of market demographic data or product and network service forecast data
      The data format may be XML The above describes features of an example implementation of the network planning module 10. However, the network planning module can be implemented in a variety of different ways.

More generally, it will be understood that the present invention has been described above purely by way of example, and modification of detail can be made within the scope of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method of performing network modification in a telecommunications network, comprising:
   storing a database comprising a master inventory defining network resources available in a network;
   storing a service inventory, the service inventory being derived from the master inventory and containing information used for provisioning of services in the network;
   provisioning services in the network using the service inventory;
   performing a network modification by a process comprising:
      modifying the database storing the master inventory;
      outputting a change record describing the modification made to the database; and
      modifying the network in dependence on the modified database using the change record;
   analyzing utilization of the network resources in the network, and planning changes to the network in dependence on an outcome of the analysis; and
   collating a plurality of change records describing modifications to the database to generate a network modification plan, the network modification plan defining a group of related network changes, and modifying the network using the network modification plan;
   wherein the related network changes are grouped based on a type of equipment to which each of the network changes relates and a network location at which the network change is to be performed, the network location including at least one of a city, a building complex, a building of the building complex, a floor of the building, a room of the building, and a logical grouping of the network resources;
   wherein analyzing and planning comprises:
      measuring the utilization of one or more of the network resources in the network over time;
      analyzing the measured utilization over time of the one or more of the network resources to determine a utilization trend; and
      predicting future utilization of the one or more of the network resources using the determined utilization trend;
   wherein measuring the utilization includes obtaining utilization data, the utilization data specifying an assignment of resources to services including an assignment of ports or timeslots, and the utilization data relating to data flow through given network resources;
   wherein planning the changes includes comparing the predicted utilization to the network resources available in the network, such that the difference determines which network resources that are unavailable in the network are to be added to the network in order to meet the predicted utilization, and from the determination of the network resources that are to be added to the network, identifying additional network resources including devices and connections needed to support the network resources to be added;
   wherein templates specify standard types of growth, shrinkage and change of network facilities, and the templates act to provide a constraint associated with a given set of possible change types for providing a more controlled and structured network.

2. A method according to claim 1, wherein the network modification comprises addition or deletion of one or more of the network resources to or from the network.

3. A method according to claim 1, wherein the database stores elements representing the network resources; and wherein modifying the database comprises adding, deleting or modifying one or more of the elements in the database.

4. A method according to claim 1, wherein provisioning a service comprises:
   modifying the service inventory in dependence on the service being provisioned; and
   configuring the network to provide the service in dependence on the modified service inventory.

5. A method according to claim 4, wherein provisioning the service further comprises generating configuration information in dependence on the service inventory modification, and transmitting the configuration information to one or more of the network resources in the network to configure the network resources to provide the service.

6. A method according to claim 1, comprising updating the service inventory in response to changes in the master inventory.

7. A method according to claim 1, wherein analyzing and planning further comprises:
   planning changes to the network in dependence on the predicted future utilization.

8. A method according to claim 1, wherein the master inventory contains information defining planned resources that are physically nonexistent in the network.

9. The method according to claim 1, wherein the utilization data specifies that, at a given network location, a number of available access ports are assigned to the services, and that a number of remaining access ports are available for provisioning of future services.

10. The method of claim 1, wherein the additional network resources, including devices and connections needed to support the network resources to be added, are implemented by way of internal services which are not directly associated with end users.

11. The method of claim 1, wherein the related network changes are further grouped based on a class of engineering personnel required to carry out the changes.

12. A method of managing a telecommunications network comprising:
   storing a database comprising a master inventory defining network resources available in a network;
   storing a database comprising a service inventory, the service inventory being derived from the master inventory and containing information used for provisioning of services in the network;
   provisioning services in the network using the service inventory;
   modifying the service inventory in response to modification of the master inventory;
   modifying the network by a process including:
      modifying the database storing the master inventory;
      outputting change information in response to modification of the master inventory; and
      modifying the network in dependence on the modified database using the change information;
   performing a network modification by a process comprising:
      outputting a change record describing the modification made to the service inventory; and modifying the network using the change record; and
analyzing utilization of the network resources in the network, and
planning changes to the network in dependence on an outcome of the analysis; and
collating a plurality of change records describing modifications to the service inventory to generate a network modification plan, the network modification plan defining a group of related network changes, and modifying the network using the network modification plan;
wherein the related network changes are grouped based on a type of equipment to which each of the network changes relates and a network location at which the network change is to be performed, the network location including at least one of a city, a building complex, a building of the building complex, a floor of the building, a room of the building, and a logical grouping of the network resources;
wherein analyzing and planning comprises:
measuring the utilization of one or more of the network resources in the network over time;
analyzing the measured utilization over time of the one or more of the network resources to determine a utilization trend; and
predicting future utilization of the one or more of the network resources using the determined utilization trend;
wherein measuring the utilization includes obtaining utilization data, the utilization data specifying an assignment of resources to services including an assignment of ports or timeslots, and the utilization data relating to data flow through given network resources;
wherein planning the changes includes comparing the predicted utilization to the network resources available in the network, such that the difference determines which network resources that are unavailable in the network are to be added to the network in order to meet the predicted utilization, and from the determination of the network resources that are to be added to the network, identifying additional network resources including devices and connections needed to support the network resources to be added;
wherein templates specify standard types of growth, shrinkage and change of network facilities, and the templates act to provide a constraint associated with a given set of possible change types for providing a more controlled and structured network.

13. A method according to claim 12, comprising provisioning a service in the network by a process including:
modifying the service inventory;
generating configuration information in response to the modification of the service inventory; and
transmitting the configuration information to the network.

14. A method according to claim 12, comprising receiving a service order relating to a service, and provisioning the service using the service inventory in response to the order.

15. A method, comprising:
storing a database comprising a master inventory defining network resources available in a telecommunications network;
storing a service inventory, the service inventory being derived from the master inventory and containing information used for provisioning of services in the network;
provisioning services in the network using the service inventory;
performing a network modification by a process comprising:
modifying the database storing the master inventory;
outputting a change record describing the modification made to the database; and
modifying the network in dependence on the modified database using the change record;
measuring utilization of one or more network resources in the network over time, utilizing a processor;
analyzing the measured utilization over time to determine a utilization trend;
calculating a predicted future utilization of the one or more network resources using the determined utilization trend; and
generating planning data defining changes to the network in dependence on the predicted future utilization of the one or more network resources;
wherein a plurality of change records describing modifications to a database are collated to generate a network modification plan, the network modification plan defining a group of related network changes, such that the network is modified using the network modification plan;
wherein the related network changes are grouped based on a type of equipment to which each of the network changes relates and a network location at which the network change is to be performed, the network location including at least one of a city, a building complex, a building of the building complex, a floor of the building, a room of the building, and a logical grouping of the network resources;
wherein measuring the utilization includes obtaining utilization data, the utilization data specifying an assignment of resources to services including an assignment of ports or timeslots, and the utilization data relating to data flow through given network resources;
wherein generating the planning data defining changes to the network includes comparing the predicted utilization to the network resources available in the network, such that the difference determines which network resources that are unavailable in the network are to be added to the network in order to meet the predicted utilization, and from the determination of the network resources that are to be added to the network, identifying additional network resources including devices and connections needed to support the network resources to be added;
wherein templates specify standard types of growth, shrinkage and change of network facilities, and the templates act to provide a constraint associated with a given set of possible change types for providing a more controlled and structured network.

16. A method according to claim 15, wherein the one or more resources are associated with a given network location; the planning data defining changes to the network at the network location.

17. A method according to claim 15, wherein the one or more resources are associated with connection resources between network locations; the planning data defining changes to the connection resources.

18. A method according to claim 15, comprising calculating a measure of a predicted demand for a type of network resource in dependence on the predicted utilization; and generating the planning data in dependence on the predicted demand.

19. A method according to claim 18, wherein the measure of the predicted demand for a type of network resource is calculated in dependence on the predicted utilization of the one or more resources and in dependence on one or more adjustment parameters.

20. A method according to claim 19, wherein the one or more adjustment parameters comprise one or more of: a global adjustment factor, a local adjustment factor or a service trend adjustment factor.

21. A method according to claim 20, comprising analyzing service data relating to services provided using the one or more network resources or a network location over time to determine a service trend; and determining the service trend adjustment factor in dependence on the service trend.

22. A method according to claim 20, wherein the global adjustment factor relates to external conditions relevant to the network, for example general economic conditions.

23. A method according to claim 20, wherein the local adjustment factor relates to conditions local to a portion of the network including the one or more network resources or the network location.

24. The method of claim 23, wherein the local adjustment factor reflects conditions which affect a network exchange of the network, including indicating a likelihood of greater-than-average growth in resource utilization at the network exchange.

25. A method according to claim 16, wherein the planning data defines one or more modifications, additions or removals of the network resources in the network.

26. A method of performing network modification in a telecommunications network, comprising:
   storing a database comprising a master inventory defining network resources available in a network;
   storing a service inventory, the service inventory being derived from the master inventory and containing information used for provisioning of services in the network;
   provisioning services in the network using the service inventory;
   performing a network modification by a process comprising:
      modifying the database storing the master inventory;
      outputting a change record describing the modification made to the database; and
      modifying the network in dependence on the modified database using the change record:
   generating planning data defining changes to the network, utilizing a processor;
   performing network modifications including the network modification in dependence on the planning data; and
   collating a plurality of change records describing modifications to a database to generate a network modification plan, the network modification plan defining a group of related network changes, and modifying the network using the network modification plan;
   wherein the related network changes are grouped based on a type of equipment to which each of the network changes relates and a network location at which the network change is to be performed, the network location including at least one of a city, a building complex, a building of the building complex, a floor of the building, a room of the building, and a logical grouping of network resources;
   wherein generating the planning data comprises:
      measuring utilization of one or more of the network resources in the network over time;
      analyzing the measured utilization over time to determine a utilization trend;
      calculating a predicted future utilization of the one or more of the network resources using the determined utilization trend; and
      generating the planning data defining changes to the network in dependence on the predicted future utilization of the one or more of the network resources;
   wherein measuring the utilization includes obtaining utilization data, the utilization data specifying an assignment of resources to services including an assignment of ports or timeslots, and the utilization data relating to data flow through given network resources;
   wherein generating the planning data defining changes to the network includes comparing the predicted utilization to the network resources available in the network, such that the difference determines which network resources that are unavailable in the network are to be added to the network in order to meet the predicted utilization, and from the determination of the network resources that are to be added to the network, identifying additional network resources including devices and connections needed to support the network resources to be added;
   wherein templates specify standard types of growth, shrinkage and change of network facilities, and the templates act to provide a constraint associated with a given set of possible change types for providing a more controlled and structured network.

27. A method of managing a telecommunications network, comprising:
   maintaining a master inventory defining network resources available in a network, utilizing a processor;
   storing a service inventory, the service inventory being derived from the master inventory and containing information used for provisioning of services in the network;
   provisioning services in the network using the service inventory;
   implementing changes to the network by:
      implementing the changes in the master inventory;
      outputting a change record describing modifications made to a database comprising the master inventory;
      translating the inventory changes into changes to the network including modifying the network using the change record; and
      analyzing utilization of the network resources in the network, and planning changes to the network in dependence on an outcome of the analysis; and
   collating a plurality of change records describing modifications to the database to generate a network modification plan, the network modification plan defining a group of related network changes, and modifying the network using the network modification plan;
   wherein the related network changes are grouped based on a type of equipment to which each of the network changes relates and a network location at which the network change is to be performed, the network location including at least one of a city, a building complex, a building of the building complex, a floor of the building, a room of the building, and a logical grouping of the network resources;
   wherein analyzing and planning comprises:
      measuring the utilization of one or more of the network resources in the network over time;
      analyzing the measured utilization over time of the one or more of the network resources to determine a utilization trend; and
      predicting future utilization of the one or more of the network resources using the determined utilization trend;
   wherein measuring the utilization includes obtaining utilization data, the utilization data specifying an assignment of resources to services including an assignment of ports or timeslots, and the utilization data relating to data flow through given network resources;

wherein planning the changes includes comparing the predicted utilization to the network resources available in the network, such that the difference determines which network resources that are unavailable in the network are to be added to the network in order to meet the predicted utilization, and from the determination of the network resources that are to be added to the network, identifying additional network resources including devices and connections needed to support the network resources to be added;

wherein templates specify standard types of growth, shrinkage and change of network facilities, and the templates act to provide a constraint associated with a given set of possible change types for providing a more controlled and structured network.

28. A method of managing a telecommunications network comprising:

maintaining a master inventory describing network resources available in a network, utilizing a processor;

maintaining a service inventory, the service inventory being derived from the master inventory and containing information used for provisioning of services in the network;

provisioning services in the network using the service inventory;

updating the service inventory in response to changes in the master inventory;

performing a network modification by a process comprising:
  outputting a change record describing a modification made to a database comprising the master inventory; and
  modifying the network using the change record;

analyzing utilization of the network resources in the network, and planning changes to the network in dependence on an outcome of the analysis; and collating a plurality of change records describing modifications to the database to generate a network modification plan, the network modification plan defining a group of related network changes, and modifying the network using the network modification plan;

wherein the related network changes are grouped based on a type of equipment to which each of the network changes relates and a network location at which the network change is to be performed, the network location including at least one of a city, a building complex, a building of the building complex, a floor of the building, a room of the building, and a logical grouping of the network resources;

wherein analyzing and planning comprises:
  measuring the utilization of one or more of the network resources in the network over time;
  analyzing the measured utilization over time of the one or more of the network resources to determine a utilization trend; and
  predicting future utilization of the one or more of the network resources using the determined utilization trend;

wherein measuring the utilization includes obtaining utilization data, the utilization data specifying an assignment of resources to services including an assignment of ports or timeslots, and the utilization data relating to data flow through given network resources;

wherein planning the changes includes comparing the predicted utilization to the network resources available in the network, such that the difference determines which network resources that are unavailable in the network are to be added to the network in order to meet the predicted utilization, and from the determination of the network resources that are to be added to the network, identifying additional network resources including devices and connections needed to support the network resources to be added;

wherein templates specify standard types of growth, shrinkage and change of network facilities, and the templates act to provide a constraint associated with a given set of possible change types for providing a more controlled and structured network.

29. A method of planning changes to a telecommunications network, comprising:

storing a database comprising a master inventory defining network resources available in a network;

storing a service inventory, the service inventory being derived from the master inventory and containing information used for provisioning of services in the network;

provisioning services in the network using the service inventory;

performing a network modification by a process comprising:
  modifying the database storing the master inventory;
  outputting a change record describing the modification made to the database; and
  modifying the network in dependence on the modified database using the change record;

measuring utilization of one or more network resources in the network over time, utilizing a processor;

analyzing the measured utilization over time to determine a utilization trend;

predicting future utilization of the one or more network resources using the determined utilization trend; and planning changes to the network in dependence on the predicted future utilization of the one or more network resources;

wherein a plurality of change records describing modifications to a database are collated to generate a network modification plan, the network modification plan defining a group of related network changes, such that the network is modified using the network modification plan;

wherein the related network changes are grouped based on a type of equipment to which each of the network changes relates and a network location at which the network change is to be performed, the network location including at least one of a city, a building complex, a building of the building complex, a floor of the building, a room of the building, and a logical grouping of the network resources;

wherein measuring the utilization includes obtaining utilization data, the utilization data specifying an assignment of resources to services including an assignment of ports or timeslots, and the utilization data relating to data flow through given network resources;

wherein planning the changes includes comparing the predicted utilization to the network resources available in the network, such that the difference determines which network resources that are unavailable in the network are to be added to the network in order to meet the predicted utilization, and from the determination of the network resources that are to be added to the network, identifying additional network resources including devices and connections needed to support the network resources to be added;

wherein templates specify standard types of growth, shrinkage and change of network facilities, and the templates act to provide a constraint associated with a given set of possible change types for providing a more controlled and structured network.

30. A method, comprising:
representing a telecommunications network in an abstract representation as a plurality of capability objects, each capability object representing a network capability;
generating planning data specifying changes to network capabilities, the changes being expressed in planning data defining planned changes to the telecommunications network at a level of abstraction corresponding to that of the abstract representation;
wherein the network capabilities are changed by:
  storing a service inventory, the service inventory being derived from a master inventory and containing information used for provisioning of services in the network, wherein the master inventory defines network resources available in the network;
  provisioning services in the network using the service inventory;
  performing a network modification by:
    modifying a database storing the master inventory;
      outputting a change record describing a modification made to the database; and
      modifying the network in dependence on the modified database using the change record;
analyzing utilization of network resources in the network, and planning changes to the network in dependence on an outcome of the analysis, utilizing a processor; and
collating a plurality of change records describing modifications to the database to generate a network modification plan, the network modification plan defining a group of related network changes, and modifying the network using the network modification plan;
wherein the related network changes are grouped based on a type of equipment to which each of the network changes relates and a network location at which the network change is to be performed, the network location including at least one of a city, a building complex, a building of the building complex, a floor of the building, a room of the building, and a logical grouping of the network resources;
wherein analyzing and planning comprises:
  measuring the utilization of one or more of the network resources in the network over time;
  analyzing the measured utilization over time of the one or more of the network resources to determine a utilization trend; and
  predicting future utilization of the one or more of the network resources using the determined utilization trend;
wherein measuring the utilization includes obtaining utilization data, the utilization data specifying an assignment of resources to services including an assignment of ports or timeslots, and the utilization data relating to data flow through given network resources;
wherein planning the changes includes comparing the predicted utilization to the network resources available in the network, such that the difference determines which network resources that are unavailable in the network are to be added to the network in order to meet the predicted utilization, and from the determination of the network resources that are to be added to the network, identifying additional network resources including devices and connections needed to support the network resources to be added;
wherein templates specify standard types of growth, shrinkage and change of network facilities, and the templates act to provide a constraint associated with a given set of possible change types for providing a more controlled and structured network.

31. A method according to claim 30, comprising modifying the abstract representation in dependence on the planning data.

32. A method according to claim 30, comprising translating the planning data specifying the changes to network capabilities at the abstract level into detailed planning data specifying network changes for implementing the capability changes.

33. A method according to claim 30, comprising storing a model of the network, the model defining the network resources of the network, and modifying the network model in dependence on the planning data.

34. A method according to claim 33, comprising storing the templates each defining changes to the network model, selecting a template in dependence on the planning data, and modifying the network model using the template.

35. A method according to claim 33, comprising implementing the network changes in the network in dependence on modifications made to the network model.

36. A method according to claim 30, wherein capability objects represent one or more of: partitions of the network resources of the network, including one of network domains, network areas, network locations, or equipment sites; physical characteristics of locations or sites; and technological capabilities or logical capabilities available at the locations or the sites or connecting the locations or the sites.

37. A method according to claim 30, wherein the abstract representation comprises a hierarchy of capability objects representing a hierarchical partitioning of the network resources of the network.

38. The method according to claim 30, wherein the network capabilities are represented independently of network resources which provide the network capabilities, the network capabilities including groupings of network resources and network functions, functional characteristics of parts of the network, and services and functions providable by at least part of the network.

39. A network management system, comprising:
a database for storing a master inventory defining network resources available in a network; and
a network management module for:
  modifying the database storing the master inventory;
  modifying the network in dependence on the modified database;
  storing a service inventory, the service inventory being derived from the master inventory and containing information used for provisioning of services in the network;
  provisioning services in the network using the service inventory;
wherein the network management system is operable such that modifying the network further comprises:
  outputting a change record describing the modification made to the database;
  modifying the network using the change record; and
  analyzing utilization of the network resources in the network, and planning changes to the network in dependence on an outcome of the analysis;

wherein the network management system is operable such that a plurality of change records describing modifications to the database are collated to generate a network modification plan, the network modification plan defining a group of related network changes, and the network is modified using the network modification plan;

wherein the network management system is operable such that the related network changes are grouped based on a type of equipment to which each of the network changes relates and a network location at which the network change is to be performed, the network location including at least one of a city, a building complex, a building of the building complex, a floor of the building, a room of the building, and a logical grouping of the network resources;

wherein the network management system is operable such that analyzing and planning comprises:
  measuring the utilization of one or more of the network resources in the network over time;
  analyzing the measured utilization over time of the one or more of the network resources to determine a utilization trend; and
  predicting future utilization of the one or more of the network resources using the determined utilization trend;

wherein the network management system is operable such that measuring the utilization includes obtaining utilization data, the utilization data specifying an assignment of resources to services including an assignment of ports or timeslots, and the utilization data relating to data flow through given network resources;

wherein the network management system is operable such that planning the changes includes comparing the predicted utilization to the network resources available in the network, such that the difference determines which network resources that are unavailable in the network are to be added to the network in order to meet the predicted utilization, and from the determination of the network resources that are to be added to the network, identifying additional network resources including devices and connections needed to support the network resources to be added;

wherein the network management system is operable such that templates specify standard types of growth, shrinkage and change of network facilities, and the templates act to provide a constraint associated with a given set of possible change types for providing a more controlled and structured network.

40. A network management system for:
storing a master inventory defining network resources available in a network;
storing a service inventory, the service inventory being derived from the master inventory and containing information used for provisioning of services in the network;
provisioning services in the network using the service inventory;
modifying the service inventory in response to modification of the master inventory;
performing a network modification by a process comprising:
  outputting a change record describing the modification made to a database comprising the master inventory;
  modifying the network using the change record; and
  analyzing utilization of the network resources in the network, and planning changes to the network in dependence on an outcome of the analysis; and collating a plurality of change records describing modifications to the database to generate a network modification plan, the network modification plan defining a group of related network changes, and modifying the network using the network modification plan;

wherein the network management system is operable such that the related network changes are grouped based on a type of equipment to which each of the network changes relates and a network location at which the network change is to be performed, the network location including at least one of a city, a building complex, a building of the building complex, a floor of the building, a room of the building, and a logical grouping of the network resources;

wherein the network management system is operable such that analyzing and planning comprises:
  measuring the utilization of one or more of the network resources in the network over time;
  analyzing the measured utilization over time of the one or more of the network resources to determine a utilization trend; and
  predicting future utilization of the one or more of the network resources using the determined utilization trend;

wherein the network management system is operable such that measuring the utilization includes obtaining utilization data, the utilization data specifying an assignment of resources to services including an assignment of ports or timeslots, and the utilization data relating to data flow through given network resources;

wherein the network management system is operable such that planning the changes includes comparing the predicted utilization to the network resources available in the network, such that the difference determines which network resources that are unavailable in the network are to be added to the network in order to meet the predicted utilization, and from the determination of the network resources that are to be added to the network, identifying additional network resources including devices and connections needed to support the network resources to be added;

wherein the network management system is operable such that templates specify standard types of growth, shrinkage and change of network facilities, and the templates act to provide a constraint associated with a given set of possible change types for providing a more controlled and structured network.

41. A network planning system for:
storing a database comprising a master inventory defining network resources available in a network;
storing a service inventory, the service inventory being derived from the master inventory and containing information used for provisioning of services in the network;
provisioning services in the network using the service inventory;
performing a network modification by a process comprising:
  modifying the database storing the master inventory;
  outputting a change record describing the modification made to the database; and
  modifying the network in dependence on the modified database using the change record;
measuring utilization of one or more network resources in the network over time;

analyzing the measured utilization over time to determine a utilization trend;
calculating a predicted future utilization of the one or more network resources using the determined utilization trend; and
generating planning data defining changes to the network in dependence on the predicted future utilization of the one or more network resources;
wherein the network planning system is operable such that a plurality of change records describing modifications to a database are collated to generate a network modification plan, the network modification plan defining a group of related network changes, such that the network is modified using the network modification plan;
wherein the network planning system is operable such that the related network changes are grouped based on a type of equipment to which each of the network changes relates and a network location at which the network change is to be performed, the network location including at least one of a city, a building complex, a building of the building complex, a floor of the building, a room of the building, and a logical grouping of the network resources;
wherein the network planning system is operable such that measuring the utilization includes obtaining utilization data, the utilization data specifying an assignment of resources to services including an assignment of ports or timeslots, and the utilization data relating to data flow through given network resources;
wherein the network planning system is operable such that generating the planning data defining changes to the network includes comparing the predicted utilization to the network resources available in the network, such that the difference determines which network resources that are unavailable in the network are to be added to the network in order to meet the predicted utilization, and from the determination of the network resources that are to be added to the network, identifying additional network resources including devices and connections needed to support the network resources to be added;
wherein the network planning system is operable such that templates specify standard types of growth, shrinkage and change of network facilities, and the templates act to provide a constraint associated with a given set of possible change types for providing a more controlled and structured network.

42. A planning system, comprising:
a processor;
memory storing a database having a planning model representing a telecommunications network using a plurality of capability objects, each capability object representing a network capability; and
the planning module adapted to generate planning data specifying changes to network capabilities in dependence on the planning model;
wherein the planning system is operable such that the network capabilities are changed by:
    storing a service inventory, the service inventory being derived from a master inventory and containing information used for provisioning of services in the network,
    wherein the master inventory defines network resources available in the network and is stored in the database;
    provisioning services in the network using the service inventory;
    performing a network modification by:
        modifying the database storing the master inventory;
        outputting a change record describing a modification made to the database;
        modifying the network in dependence on the modified database using the change record; and
    analyzing utilization of network resources in the network, and planning changes to the network in dependence on an outcome of the analysis;
wherein the planning system is operable such that a plurality of change records describing modifications to the database are collated to generate a network modification plan, the network modification plan defining a group of related network changes, and the network is modified using the network modification plan;
wherein the planning system is operable such that the related network changes are grouped based on a type of equipment to which each of the network changes relates and a network location at which the network change is to be performed, the network location including at least one of a city, a building complex, a building of the building complex, a floor of the building, a room of the building, and a logical grouping of the network resources;
wherein the planning system is operable such that analyzing and planning comprises:
    measuring the utilization of one or more of the network resources in the network over time;
    analyzing the measured utilization over time of the one or more of the network resources to determine a utilization trend; and
    predicting future utilization of the one or more of the network resources using the determined utilization trend;
wherein the planning system is operable such that measuring the utilization includes obtaining utilization data, the utilization data specifying an assignment of resources to services including an assignment of ports or timeslots, and the utilization data relating to data flow through given network resources;
wherein the planning system is operable such that planning the changes includes comparing the predicted utilization to the network resources available in the network, such that the difference determines which network resources that are unavailable in the network are to be added to the network in order to meet the predicted utilization, and from the determination of the network resources that are to be added to the network, identifying additional network resources including devices and connections needed to support the network resources to be added;
wherein the planning system is operable such that templates specify standard types of growth, shrinkage and change of network facilities, and the templates act to provide a constraint associated with a given set of possible change types for providing a more controlled and structured network.

* * * * *

UNITED STATES PATENT AND TRADEMARK OFFICE
CERTIFICATE OF CORRECTION

| | | |
|---|---|---|
| PATENT NO. | : 8,082,335 B2 | |
| APPLICATION NO. | : 11/356392 | |
| DATED | : December 20, 2011 | |
| INVENTOR(S) | : Mishra et al. | |

It is certified that error appears in the above-identified patent and that said Letters Patent is hereby corrected as shown below:

Claim 26, col. 31, line 42; please replace "record:" with --record;--.

Signed and Sealed this
Thirtieth Day of October, 2012

David J. Kappos
*Director of the United States Patent and Trademark Office*